(12) United States Patent
Dinescu et al.

(10) Patent No.: US 11,807,141 B2
(45) Date of Patent: Nov. 7, 2023

(54) CHILD SAFETY SEAT WITH ENERGY ABSORBER

(71) Applicant: Clek Inc., Toronto (CA)

(72) Inventors: Iuliu Dinescu, Aurora (CA); Giuseppe Rotiroti, King City (CA); Quinn Hu, North York (CA)

(73) Assignee: Clek Inc., Toronto (CA)

( * ) Notice: Subject to any disclaimer, the term of this patent is extended or adjusted under 35 U.S.C. 154(b) by 179 days.

(21) Appl. No.: 17/422,192

(22) PCT Filed: Jan. 10, 2020

(86) PCT No.: PCT/CA2020/050030
§ 371 (c)(1),
(2) Date: Jul. 10, 2021

(87) PCT Pub. No.: WO2020/142853
PCT Pub. Date: Jul. 16, 2020

(65) Prior Publication Data
US 2022/0089068 A1 Mar. 24, 2022

Related U.S. Application Data

(60) Provisional application No. 62/790,784, filed on Jan. 10, 2019.

(51) Int. Cl.
*B60N 2/28* (2006.01)
(52) U.S. Cl.
CPC ......... *B60N 2/2884* (2013.01); *B60N 2/2806* (2013.01); *B60N 2/2821* (2013.01)

(58) Field of Classification Search
CPC ... B60N 2/2884; B60N 2/2806; B60N 2/2821
See application file for complete search history.

(56) References Cited

U.S. PATENT DOCUMENTS

| 3,917,339 | A | | 11/1975 | Fritz | |
|---|---|---|---|---|---|
| 5,052,750 | A | | 10/1991 | Takahashi | |
| 5,462,333 | A | * | 10/1995 | Beauvais | B60N 2/2875 297/216.19 |
| 5,664,830 | A | | 9/1997 | Garcia | |
| 8,348,337 | B2 | * | 1/2013 | Franck | B60N 2/2809 297/216.19 |
| 9,016,781 | B2 | * | 4/2015 | Cheng | B60N 2/42709 297/256.16 |

(Continued)

FOREIGN PATENT DOCUMENTS

| CA | 2892155 A1 * | 11/2015 | ........... B60N 2/2809 |
|---|---|---|---|
| EP | 1215077 A1 | 6/2002 | |

*Primary Examiner* — Philip F Gabler
(74) *Attorney, Agent, or Firm* — Graham Patent Law

(57) ABSTRACT

A seat base includes a base pan and a base lid secured to the base pan. The base lid and the base plan together define a cavity therebetween. An energy absorber is disposed within the cavity and includes an impactor piston provided on the base lid and an energy absorbing member supported by the base pan. The energy absorbing member is configured to translate away from the base pan and towards the base lid during a deceleration of the safety base. The impactor piston is configured to deform the energy absorbing member and to dissipate impact forces imposed on the seat base during the deceleration of the seat base.

10 Claims, 26 Drawing Sheets

(56) References Cited

U.S. PATENT DOCUMENTS

| | | | |
|---|---|---|---|
| 9,132,754 B2 * | 9/2015 | Mindel | B60N 2/42709 |
| 9,421,889 B2 * | 8/2016 | Minato | B60N 2/42709 |
| 9,878,644 B2 * | 1/2018 | Zhou | B60N 2/2809 |
| 10,176,697 B2 * | 1/2019 | Mindel | G08B 21/24 |
| 10,518,671 B2 * | 12/2019 | Mitchell | B60N 2/2884 |
| 2009/0302647 A1 | 12/2009 | Przybylo | |
| 2011/0062756 A1 | 3/2011 | Campbell | |
| 2011/0227376 A1 * | 9/2011 | Franck | B60N 2/2821 297/216.11 |
| 2013/0033076 A1 | 2/2013 | Campbell | |
| 2016/0082865 A1 * | 3/2016 | Zhou | B60N 2/2821 297/216.11 |
| 2016/0207427 A1 | 7/2016 | Wang | |
| 2017/0140634 A1 * | 5/2017 | Mindel | B60N 2/2863 |
| 2020/0009997 A1 | 1/2020 | Will | |

* cited by examiner

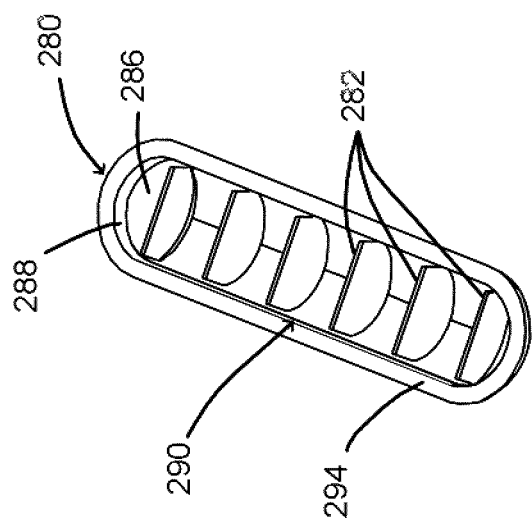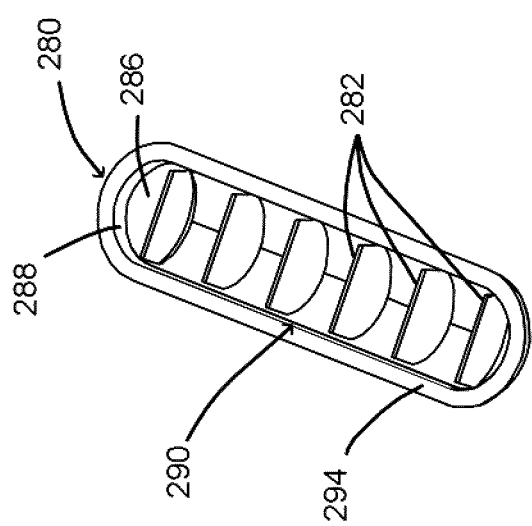
Fig. 25

CHILD SAFETY SEAT WITH ENERGY ABSORBER

FIELD

This patent application relates to a safety seat intended for installation in an automotive vehicle.

BACKGROUND

A child traveling in a motor vehicle is particularly vulnerable to injury from impact forces when the vehicle stops suddenly. Efforts have been made to develop child safety seats that reduce the effect of these forces on the child.

SUMMARY

As described in this patent application, there is provided a child safety seat that includes an integrated belt tensioning system that applies tension to a vehicle seat lap belt or lap/shoulder belt (hereinafter "vehicle belt") that may be connected to the child safety seat and thereby secures the child safety seat to the vehicle seat.

The child safety seat includes a seat base, and a seat body that is detachably coupled to the seat base. The seat base includes a base portion and a belt tensioning system.

The belt tensioning system includes a tensioning arm, a release mechanism and a capture mechanism. The tensioning arm is pivotably coupled to the base portion and is movable through a release position, a tension position and an unloaded position. The tensioning arm is also configured to frictionally engage a vehicle belt that is disposed between the tensioning arm and the base portion when the tensioning arm is disposed in the tension and unloaded positions. Conversely, the vehicle belt is disengaged from the tensioning arm when the tensioning arm is disposed in the release position.

The release mechanism is coupled to the tensioning arm. The capture mechanism is coupled to the base portion and is movable between (i) an engaged position in which the tensioning arm is precluded by the capture mechanism from moving into the release position, and (ii) a disengaged position in which the tensioning arm is free to move into the release position.

When the tensioning arm is disposed in the tension position and the capture mechanism is disposed in the engaged position, the vehicle belt applies a load to the capture mechanism via the tensioning arm and the capture mechanism is precluded from moving into the disengaged position. Conversely, when the tensioning arm is disposed in the unloaded position, the release mechanism is configured to release the tensioning arm from the capture mechanism, and the load is removed from the capture mechanism.

As also described in this patent application, there is provided a child safety seat base that includes an energy absorber that is configured to dissipate impact forces that may be imposed on the seat base during a deceleration of the seat base.

The seat base includes a base pan, and a base lid that is secured to the base pan. The base lid and the base plan together define a cavity therebetween. The seat base also includes an energy absorber that is disposed within the cavity and includes an impactor piston and an energy absorbing member. The impactor piston is provided on the base lid, and the energy absorbing member is supported by the base pan.

The energy absorbing member is configured to translate away from the base pan and towards the base lid during a deceleration of the seat base. The impactor piston is configured to deform the energy absorbing member and to dissipate impact forces that may be imposed on the seat base during the deceleration of the seat base.

In one implementation, the energy absorbing member includes an elongate axis, and a plurality of resilient ribs that extend transverse to the elongate axis. The impactor piston includes at least one impactor rib that extends substantially parallel to the elongate axis, and is configured to deform the resilient ribs as the resilient ribs translate towards the base lid.

The resilient ribs may each include a pair of opposite rib ends, and the energy absorbing member may also include an absorber bottom and an absorber side wall. The resilient ribs may be secured to and extend from the absorber bottom. The absorber side wall may extend from the absorber bottom and surround the resilient ribs. A gap, provided between the absorber sidewall and the rib ends, may facilitate bending movement of the resilient ribs as the impactor piston deforms the resilient ribs.

BRIEF DESCRIPTION OF THE DRAWINGS

The child safety seat will now be described, by way of example, with reference to the accompanying drawings, in which:

FIG. 25 is a top perspective view of the energy absorbing members;

DETAILS

Figure 1:
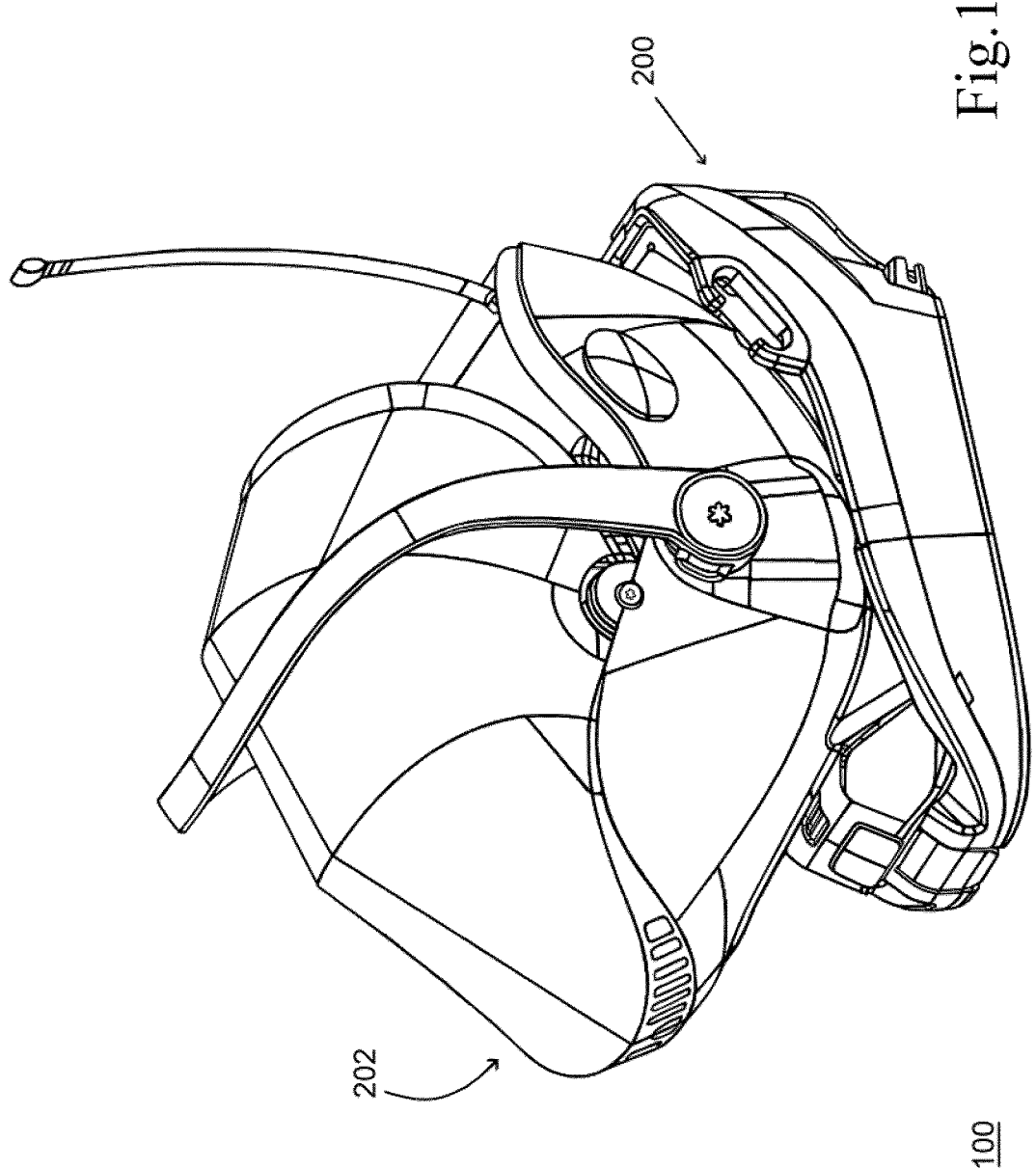
FIG. 1 is a front perspective view of the child safety seat, depicting the seat body and the seat base.

Turning to FIG. 1, there is shown a child safety seat 100 as configured for installation in a motor vehicle, such as a car or truck. As shown, the child safety seat 100 includes a seat base 200 and a seat body 202. The child safety seat 100 may also include a rigid latch mechanism (see, e.g. FIG. 8) for securing the safety seat 100 to a LATCH (Lower Anchors and Tethers for CHildren) system that may be provided in the motor vehicle.

The safety seat 100 may be installed in the motor vehicle by placing the seat base 200 on a vehicle seat, and securing the seat 100 to the motor vehicle by attaching a lap belt or lap/shoulder belt ("vehicle belt") to the seat base 200 and/or interfacing the rigid latch mechanism with corresponding LATCH system anchors that may be fixed to the vehicle proximate the rear of the vehicle seat.

Figure 2:
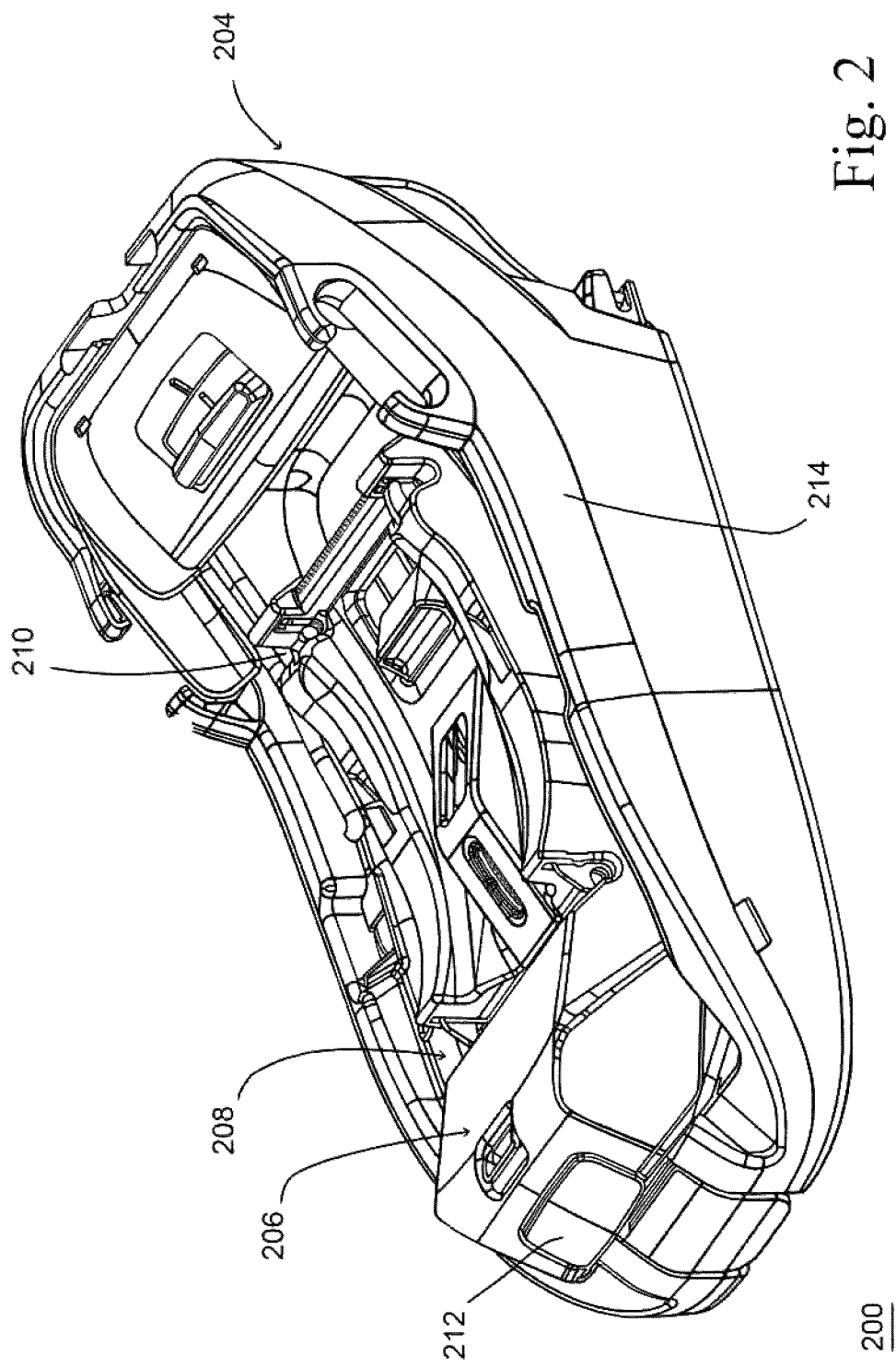
FIG. 2 is a front perspective view of the seat base, depicting the base portion and the sled assembly.

As shown in FIG. 2, the seat base 200 may include a base portion 204, and a sled assembly 206. The seat body 202 may be detachably coupled to the sled assembly 206, and the sled assembly 206 may be slidably coupled to the base portion 204 to thereby allow the incline angle of the sled assembly 206 (and therefore, the incline angle of the seat body 202) to be manually adjusted.

In FIGS. 3-18, the base portion 204 is depicted without certain exterior features to thereby better illustrate some of the interior features thereof.

Figure 3:
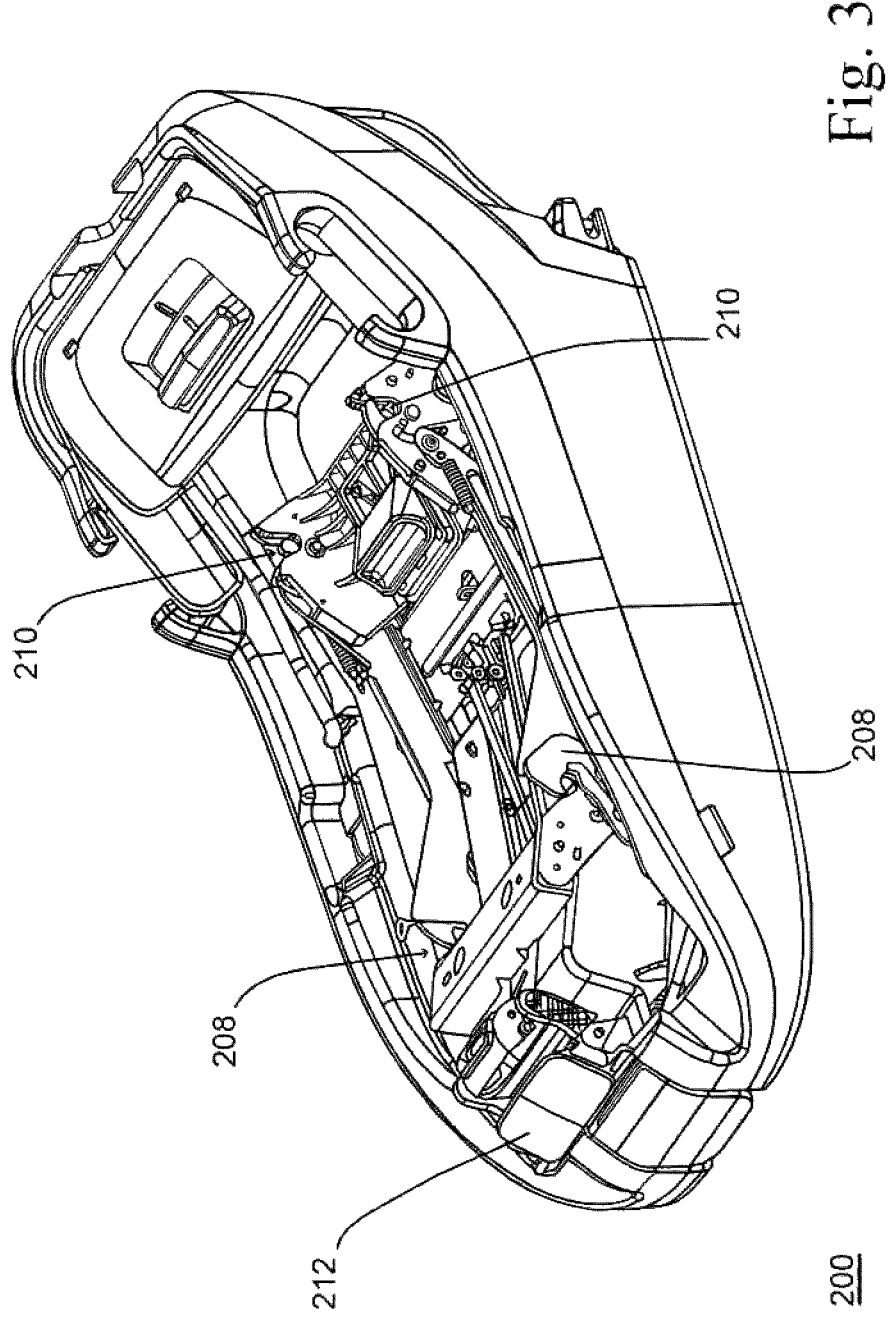
FIG. 3 is a front perspective view of the seat base, depicted without the sled assembly cover plate, exposing details of the seat body attachment/release mechanism.

As shown in FIGS. 2 and 3, the sled assembly 206 includes a pair of front latches 208, a pair of rear latches 210, and a seat release lever 212 that is coupled to the latches 208, 210. The latches 208, 210 extend through the upper cover plate of the sled assembly 206 and rotate between a closed position and an open position when the seat release lever 212 is actuated. The latches 208, 210 are oriented to capture corresponding pins provided on the underside of the seat body 202. Therefore, the seat body 202 may be secured to the top surface of the sled assembly 206 via the latches 208, 210, and may be detached from the sled assembly 206 (see, e.g. FIG. 2) by actuating the seat release lever 212 (thereby opening the latches 208, 210), leaving the seat base 200 (and the sled assembly 206) secured to the motor vehicle.

Figure 4:
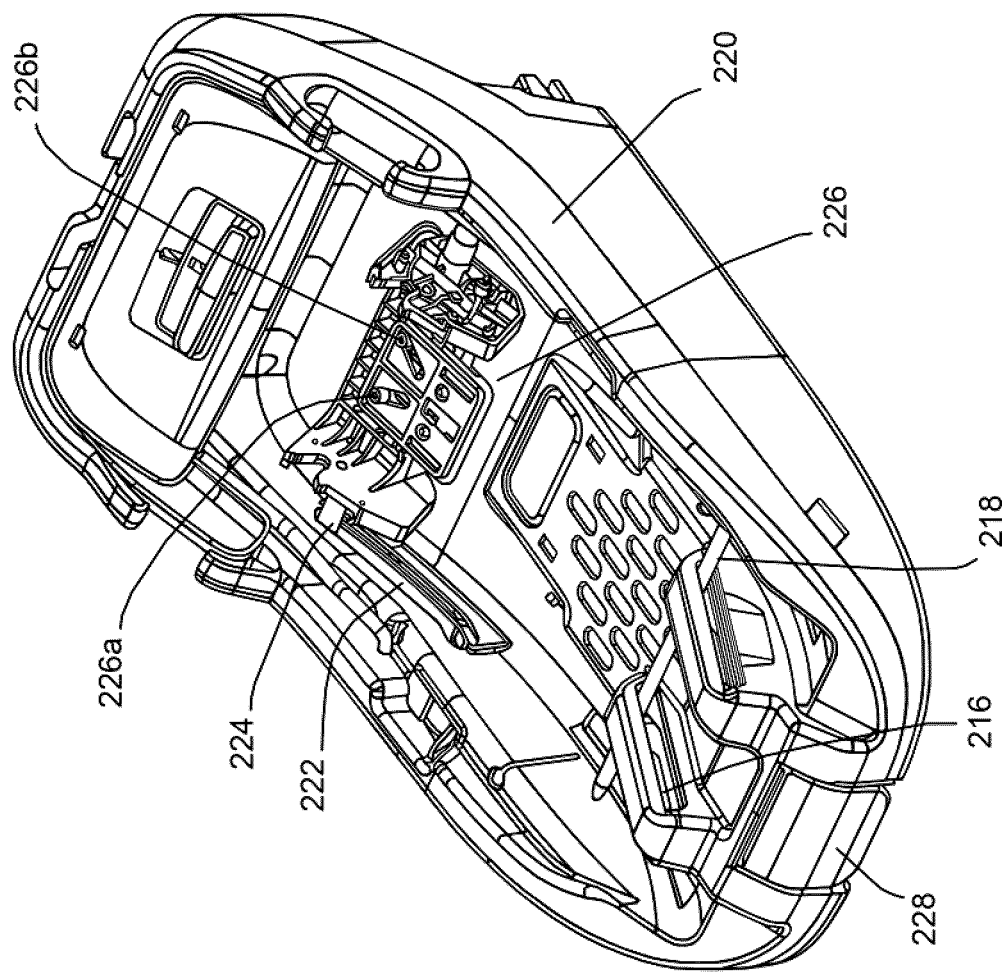
FIG. 4 is a front perspective view of the seat base, depicted without the sled assembly, exposing details of the sled incline angle adjustment mechanism.
Figure 5:
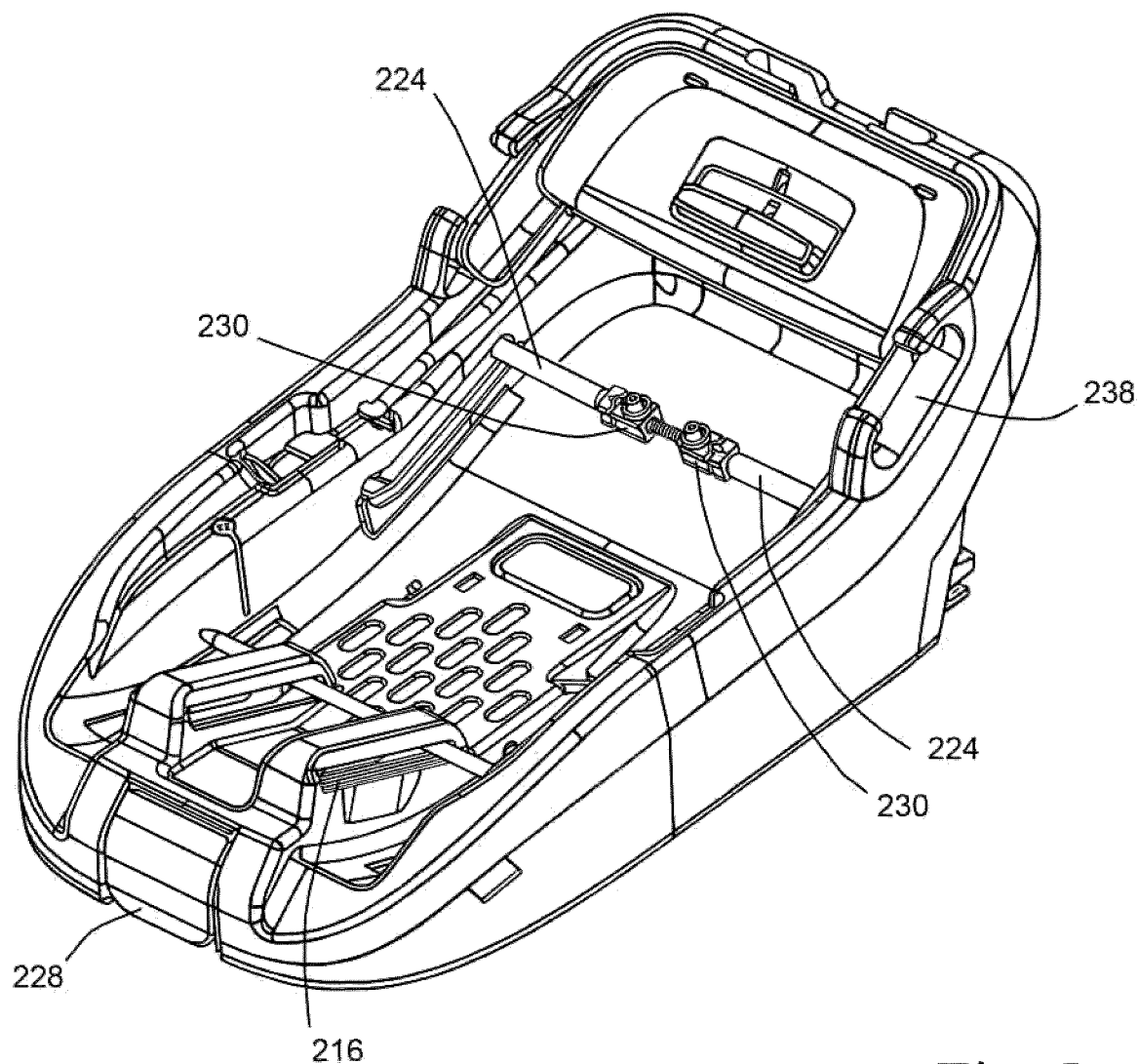
FIG. 5 is a front perspective view of the seat base, depicting additional details of the sled incline angle adjustment mechanism.
Figure 6:
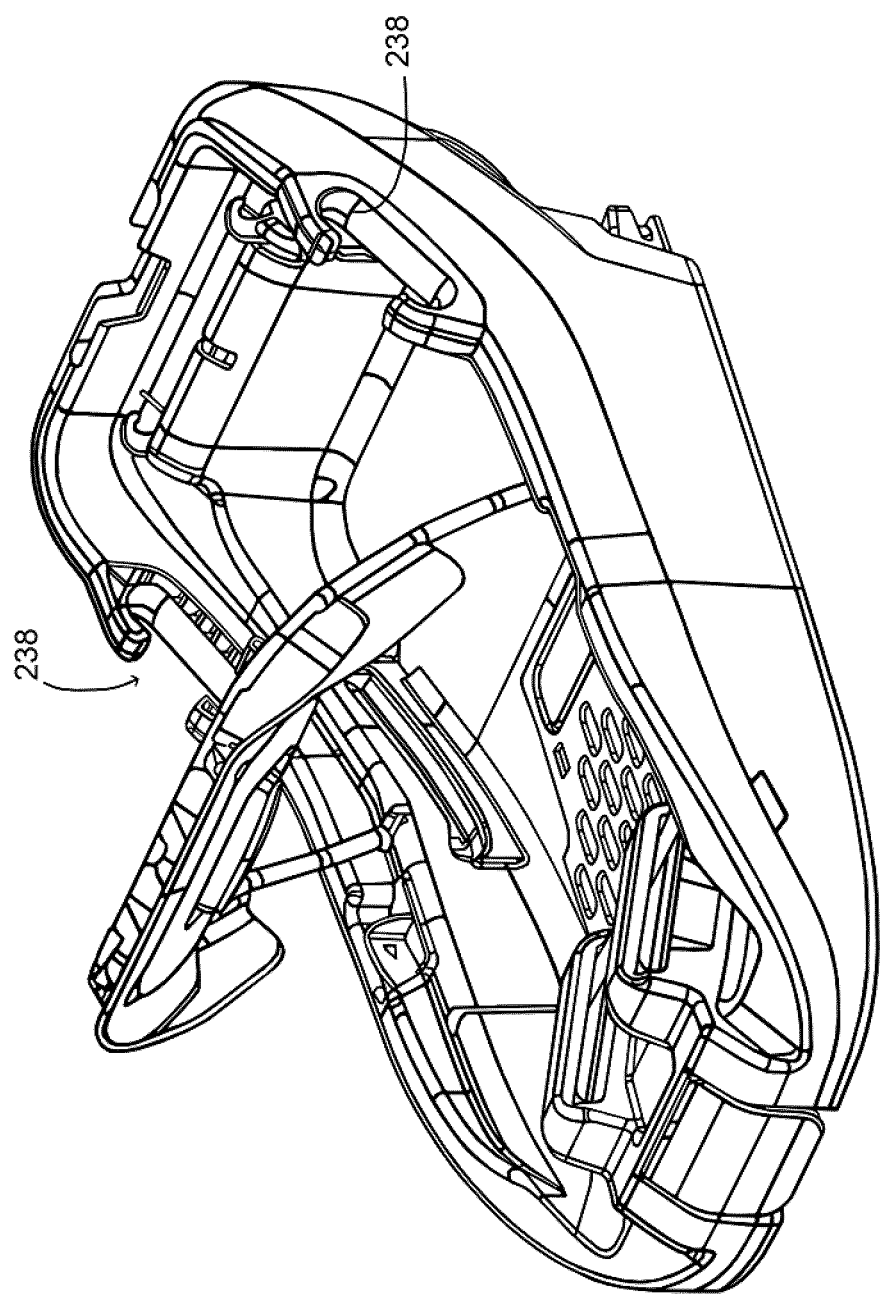
FIG. 6 is a front perspective view of the seat base, depicted without the sled assembly but with the belt tensioning system in a release position.
Figure 7:
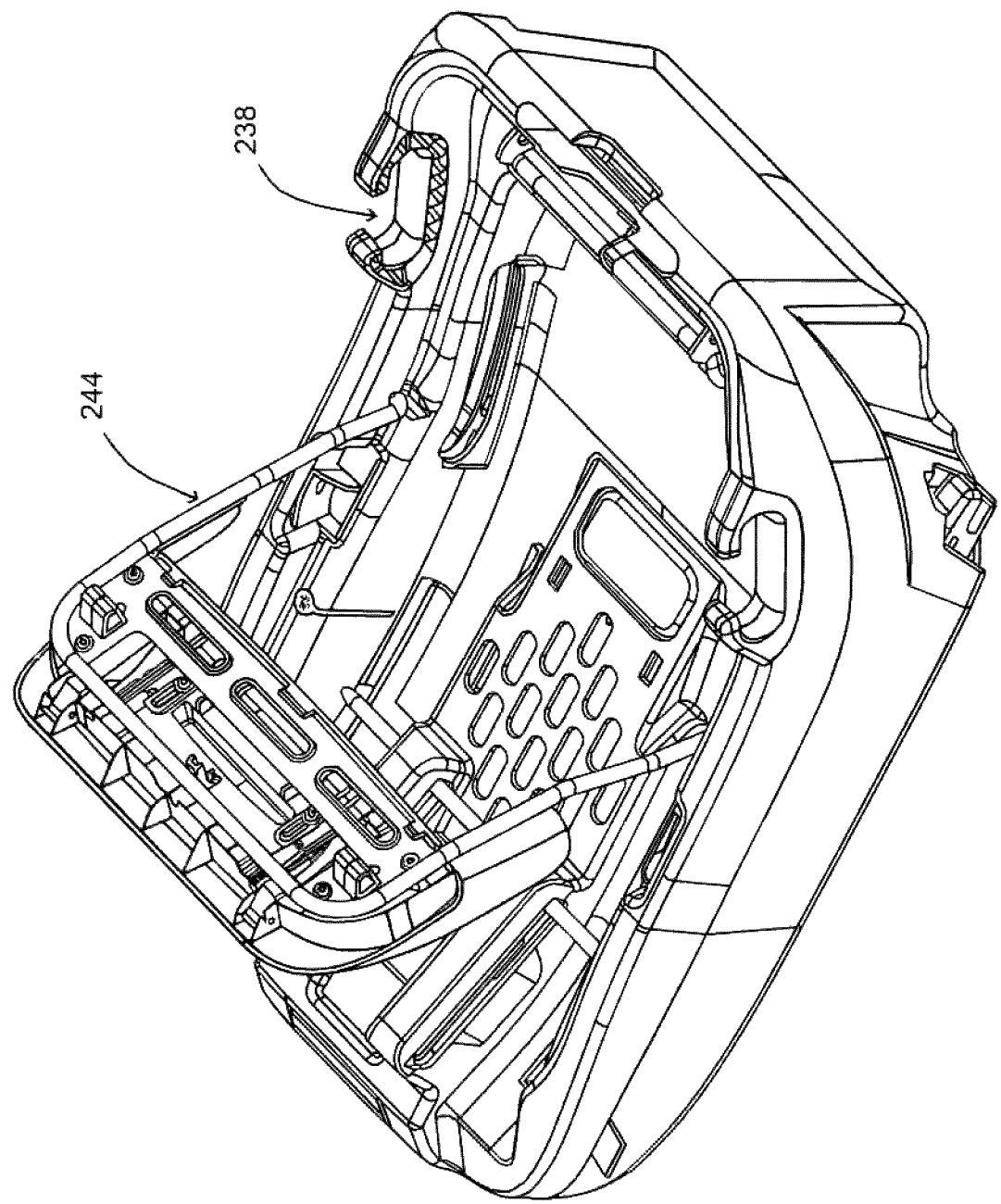
FIG. 7 is a rear perspective view of the seat base, as depicted in FIG. 6.

The sled assembly 206 includes a pair of sled side walls 214, and a mounting hole (not shown) that is provided in each of the sled side walls 214. As shown in FIG. 4, the base portion 204 includes a front elongate slide channel 216, and the sled assembly 206 may be coupled to the base portion 204 via a slide rod 218 that is retained within the mounting holes and extends through the front slide channel 216.

As shown in FIG. 4, the base portion 204 also includes a pair of base sides 220, and a rear elongate slide channel 222 that is provided in each of the base sides 220. The sled assembly 206 also includes a pair of retractable locking pins 224, an A-shaped pin guide 226 and an incline adjustment lever 228. The locking pins 224 extend through (and retract from) the sled side walls 214 along a transverse axis extending between the base sides 220. The pin guide 226 includes a pair of guide channels 226a, 226b that are disposed at an acute (e.g. 45 degree) angle relative to the axis of the locking pins 224.

Each locking pin 224 is coupled to the pin guide 226 via a pin block 230 (see, e.g. FIG. 5) that is provided on an inner end of the locking pin 224 and extends through a respective one of the guide channels 226a, 226b. Each rear slide channel 222 includes a plurality of pin holes (not shown), and the retractable locking pins 224 extend from the pin guide 226 into a respective one of the pin holes.

The incline adjustment lever 228 is coupled to the pin guide 226. Actuation of the incline adjustment lever 228 pulls the pin guide 226 along an axis perpendicular to the axis of the locking pins 224, in a direction away from the rear of the sled assembly 206, thereby causing the pin blocks 230 and the locking pins 224 to move inwardly towards the centre of the sled assembly 206.

As shown, the front slide channel 216 of the base portion 204 has a major axis, and the rear slide channel 222 has a major axis that is not parallel to the major axis of the front slide channel 216. Before the safety seat installer attaches the seat body 202 to the seat base 200, the safety seat installer may adjust the incline angle of the sled assembly 206 by actuating the incline adjustment lever 228 (thereby retracting the locking pins 224 from the respective pin holes of the base portion 204), and manually sliding the sled assembly 206 relative to the base portion 204 (via the front slide channel 216 and the rear slide channel 222) until the desired incline angle has been reached. The safety seat installer may then release the incline adjustment lever 228, thereby releasing the locking pins 224 into respective pin holes of the base portion 204 and locking the sled assembly 206 in position relative to the base portion 204.

Figure 9:
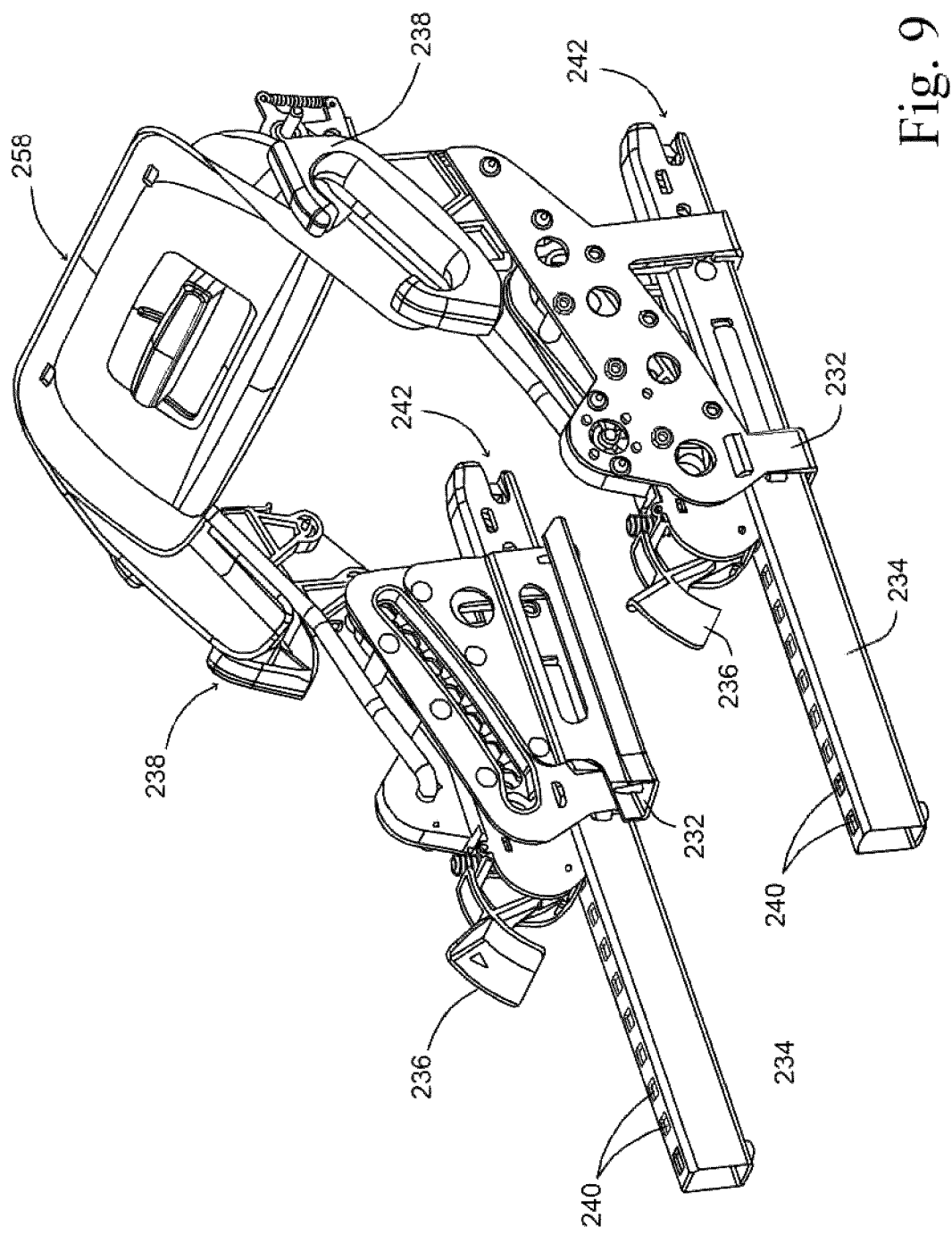
FIG. 9 is a top perspective view of the seat base, as depicted in FIG. 8, but with elements removed to be better show the rigid latch mechanism and the belt tensioning system.

As noted above, the child safety seat 100 may include a rigid latch mechanism. Therefore, as shown in FIG. 9, each base side 220 incorporates a respective rigid latch mechanism that includes a latch housing 232, an elongate latch member 234, and a latch release lever 236. Each latch housing 232 is rigidly secured to the respective base side 220, and may rigidly support a belt guide 238 that is secured thereto and configured to capture a vehicle belt extending across the base portion 204 via the belt guides 238.

Each latch member 234 is slidably captured within the respective latch housing 232 and may include a plurality of apertures 240 formed in the upper surface of the latch member 234. The latch release lever 236, when released, engages a respective one of the apertures 240 and thereby prevents the respective latch member 234 from moving within the latch housing 232. Conversely, the latch release lever 236, when actuated, retracts from the respective aperture 240 and thereby allows the respective latch member 234 to slide within the latch housing 232.

Each latch member 234 also incorporates a pair of opposed jaws 242 that are disposed at one end of the latch member 234, proximate the rear of the child safety seat 100, and are configured to capture a correspond LATCH system anchor on the vehicle. Each pair of jaws 242 is connected to the respective latch member 234 via a linkage mechanism that is disposed within the latch member 234. The linkage mechanism locks the jaws 242 in a closed position as the latch member 234 retracts into the latch housing 232, and allows the jaws 242 to open when the respective latch member 234 is extended from the latch housing 232. Therefore, the child safety seat 100 may be secured to the vehicle by manually extending the latch members 234 rearwardly from the safety seat 100, securing the latch members 234 to the vehicle anchors via the jaws 242, and sliding the child safety seat 100 on the vehicle seat cushion, rearwards towards the vehicle seat back (while actuating the latch release lever 236), thereby withdrawing the latch members 234 into the latch housings 232 and locking the jaws 242 to the vehicle anchors.

Figure 10:
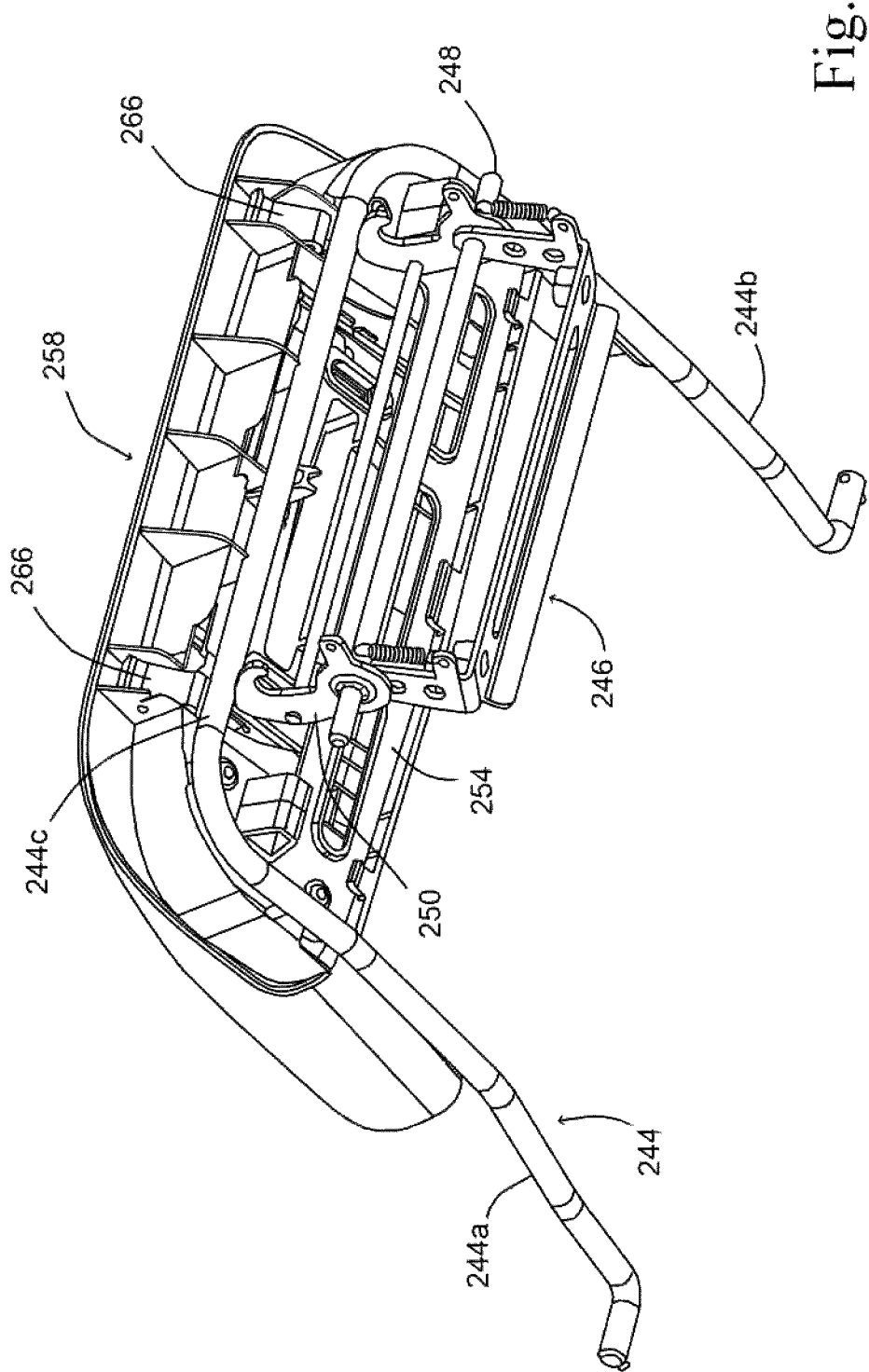
FIG. 10 is a bottom perspective view of the belt tensioning system, depicting the tensioning arm, the capture mechanism and the release mechanism in a pre-tension position.

The seat base 200 also includes a belt tensioning system that is configured to apply tension to a vehicle belt that is captured by the belt guides 238, and thereby firmly secure the base portion 204 to the vehicle seat. As shown in FIG. 10, the belt tensioning system includes a tensioning arm 244, a capture mechanism and a release mechanism. The tensioning arm 244 has a substantially U-shape and, therefore, includes a pair of substantially linear side arms 244*a*, 244*b* and a transverse arm 244*c* that is integral with and extends laterally between the side arms 244*a*, 244*b*. Each side arm 244*a*, 244*b* also extends laterally outwards at a respective end thereof, distal from the transverse side arm 244*c*. Each laterally-extending end is captured within a bushing (not shown) that is provided within a respective one of the respective latch housings 232. Therefore, the tensioning arm 244 is pivotably coupled to the base portion 204 (via the latch housings 232).

As will be explained, the tensioning arm 244 can be rotated (about an axis of rotation defined by the laterally-extending ends thereof) between a release position (see, e.g. FIG. 6) and an unloaded position, via a tension position (see, e.g. FIGS. 8, 13-15) that is disposed between the release position and the unloaded position. The tensioning arm 244, together with the capture mechanism, is configured to frictionally engage a vehicle belt that is disposed between the tensioning arm 244 and the base portion 204 when the tensioning arm 244 is disposed in the tension position (and thereby firmly secure the base portion 204 to the vehicle seat). The tensioning arm 244, together with the release mechanism, is also configured to allow the vehicle belt to become disengaged/released from the tensioning arm 244 when the tensioning arm 244 is disposed in the release position (and thereby allow the base portion 204 to be disengaged from the vehicle seat).

The tensioning arm 244 is also configured to frictionally engage the vehicle belt when the tensioning arm 244 is rotated into the unloaded position. As will be explained, when the tensioning arm 244 is disposed in the tension position, the vehicle belt will apply a load to the tensioning arm 244 and the capture mechanism. Therefore, prior to rotating the tensioning arm 244 from the tension position into the release position, the safety seat installer may rotate the tensioning arm 244 into the unloaded position to thereby reduce the load on the tensioning arm 244 and the capture mechanism (applied thereto via the tension in the vehicle belt) and thereby facilitate release of the tensioning arm 244 from the capture mechanism.

The capture mechanism includes a mounting frame 246, an axle member 248, and at least one A-hook 250, and may also include a rod that interconnects the A-hooks 250. The mounting frame 246 is fixed to the base portion 204 proximate the rear of the child safety seat 100. The axle member 248 is disposed between the side arms 244*a*, 244*b* of the tensioning arm 244. Further, the axle member 248 may be rotatably coupled to the mounting frame 246 (e.g. via bushings), and the A-hook(s) 250 may be fixed to the axle member 248. Alternately, the axle member 248 may be fixed to the mounting frame 246, and the A-hook(s) 250 may be rotatably coupled to the axle member 248. Therefore, each A-hook 250 is rotatably coupled to base portion 204 (via the mounting frame 246 and the axle member 248). Further, the axle member 248 extends along a pivot axis that is substantially parallel to the transverse arm 244*c*. Therefore, each A-hook 250 is rotatable about the pivot axis.

As will be explained, each A-hook 250 is rotatable (about the pivot axis) between (i) an engaged position (see, e.g. FIGS. 13-15) in which the tensioning arm 244 is disposed in the tension position (or the unloaded position) and is precluded by the capture mechanism from moving into the release position, and (ii) a disengaged position (see, e.g. FIGS. 16-18) in which the tensioning arm 244 is free to move from the unloaded position into the release position. The capture mechanism may also include at least one return spring 252 that extends between the mounting frame 246 and a respective one of the A-hooks 250, and urges the respective A-hook 250 to rotate into (return to) the engaged position from the disengaged position.

Figure 14:
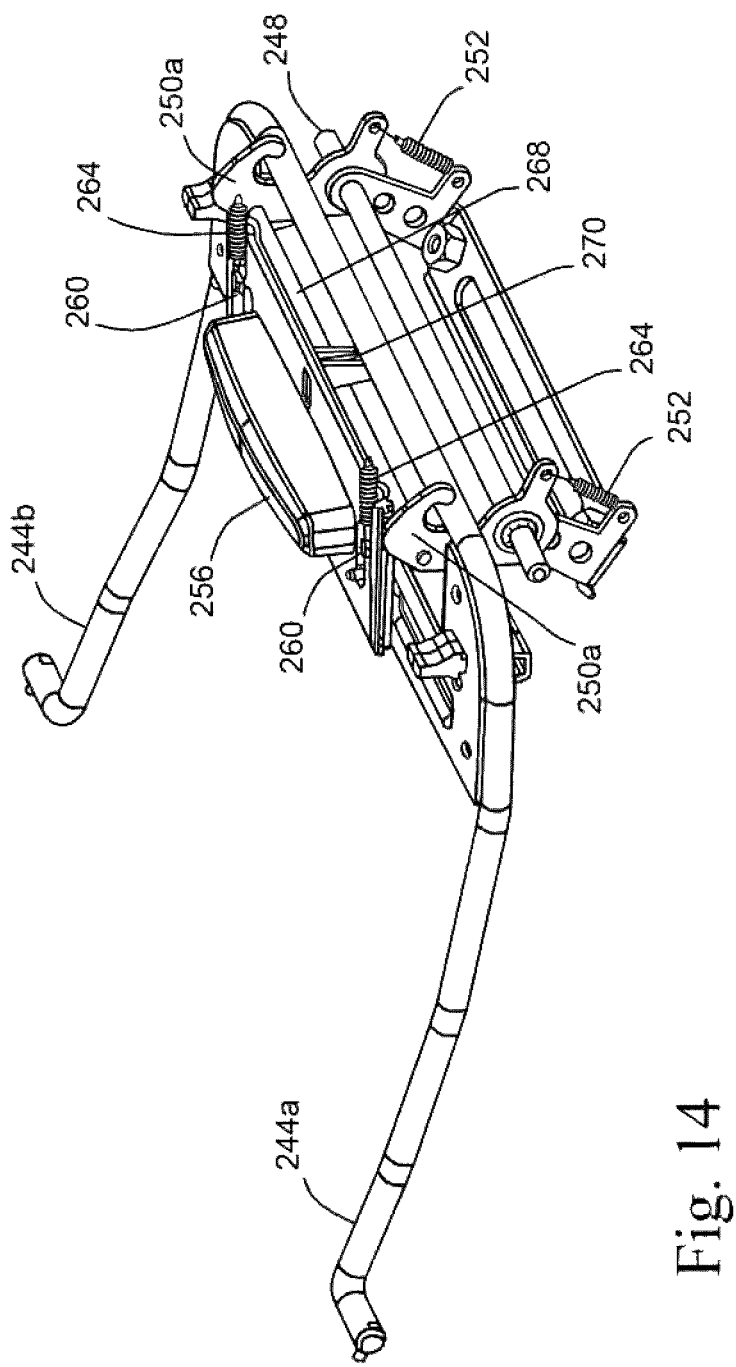
FIG. 14 is a top perspective view of the belt tensioning system as shown in FIG. 13, but with elements removed to be better show the capture mechanism and the release mechanism.
Figure 15:
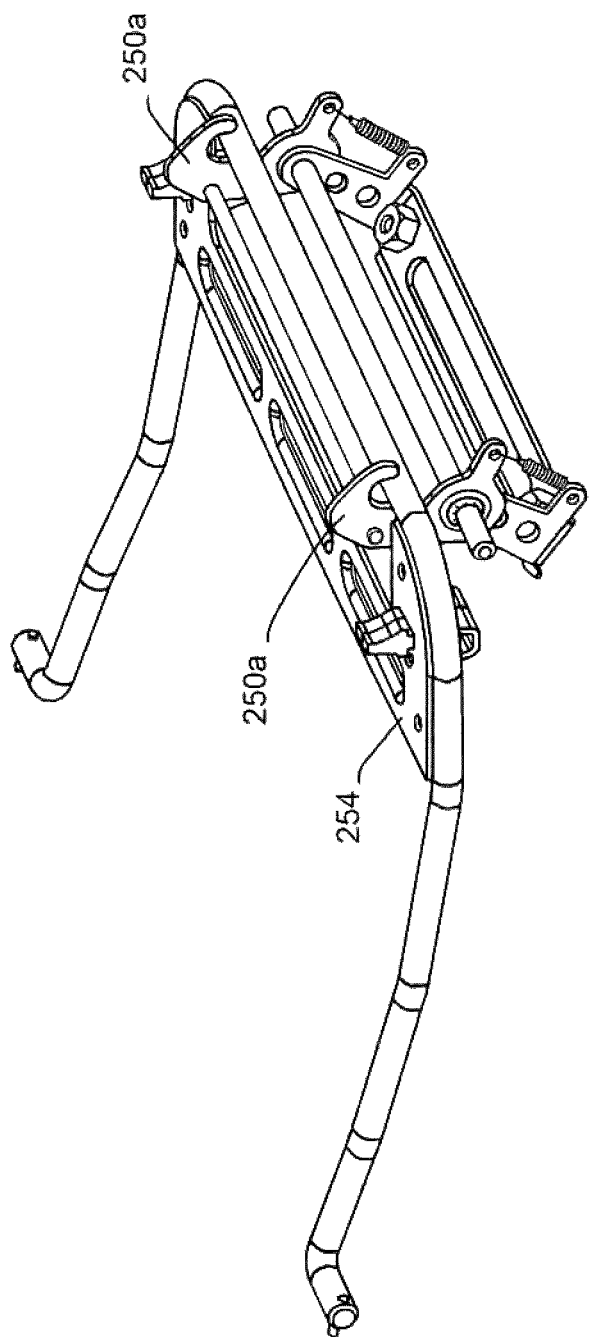
FIG. 15 is a top perspective view of the belt tensioning system as shown in FIG. 14, but depicted without the release mechanism.
Figure 16:
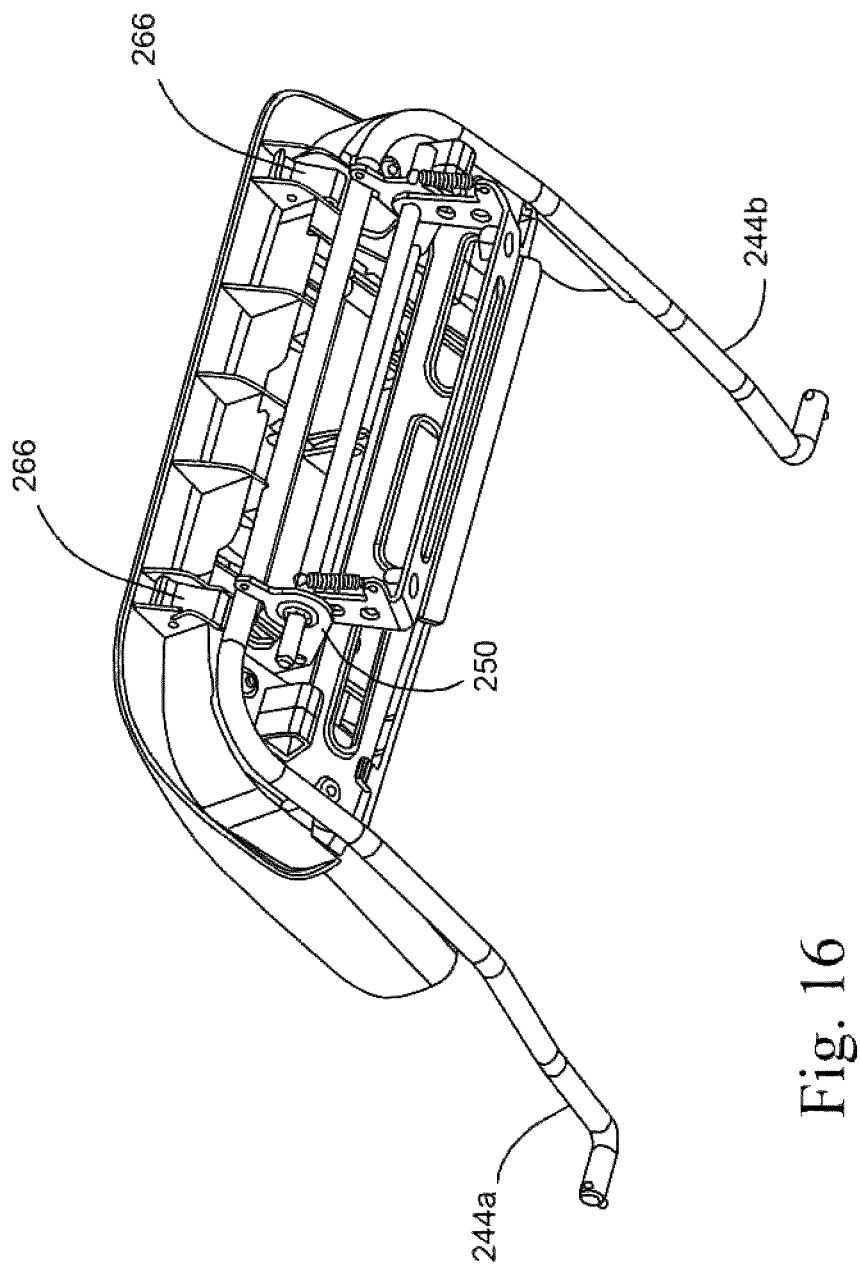
FIG. 16 is a bottom perspective view of the belt tensioning system, depicting the release mechanism and the capture mechanism in a disengaged position.
Figure 17:
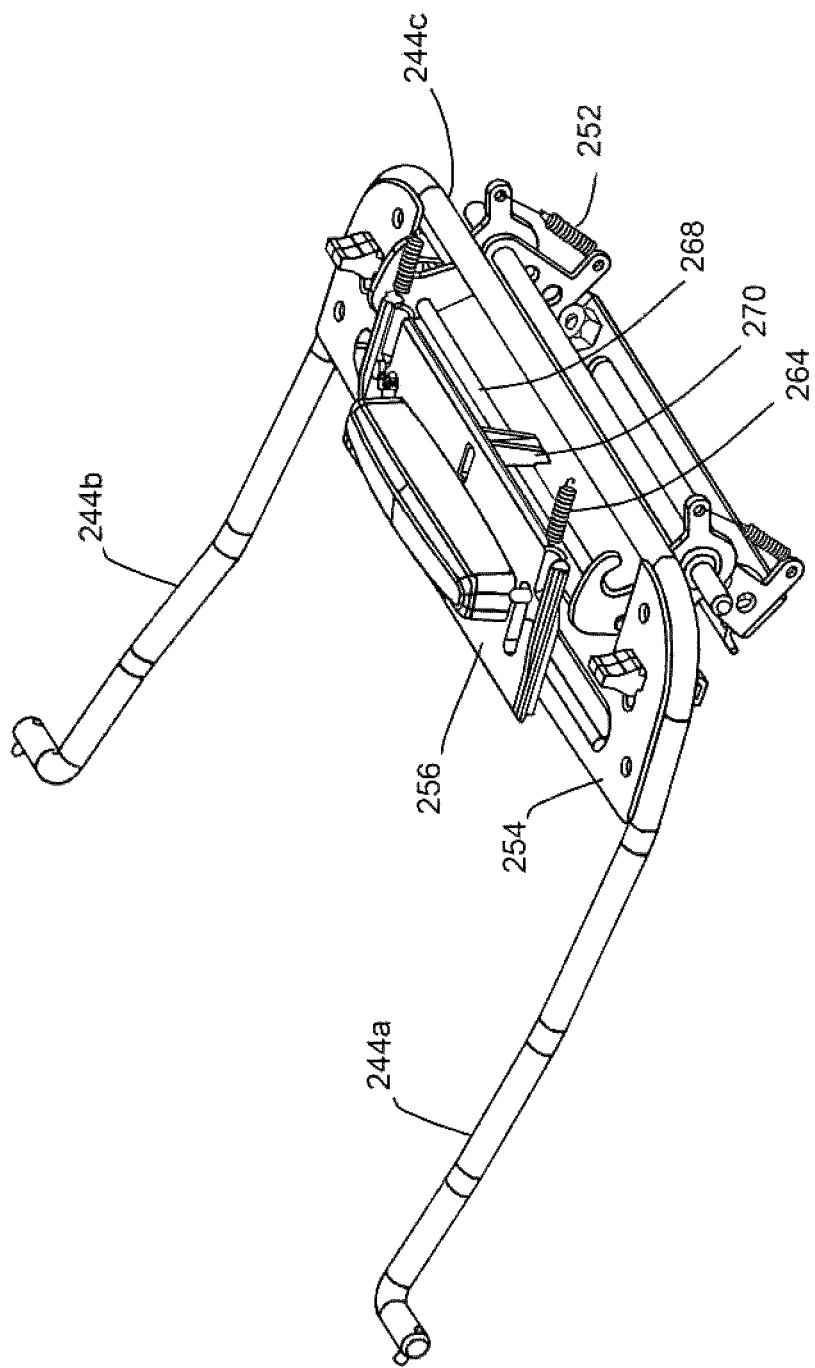
FIG. 17 is a top perspective view of the belt tensioning system shown in FIG. 16, but with elements removed to be better show the capture mechanism and the release mechanism.
Figure 18:
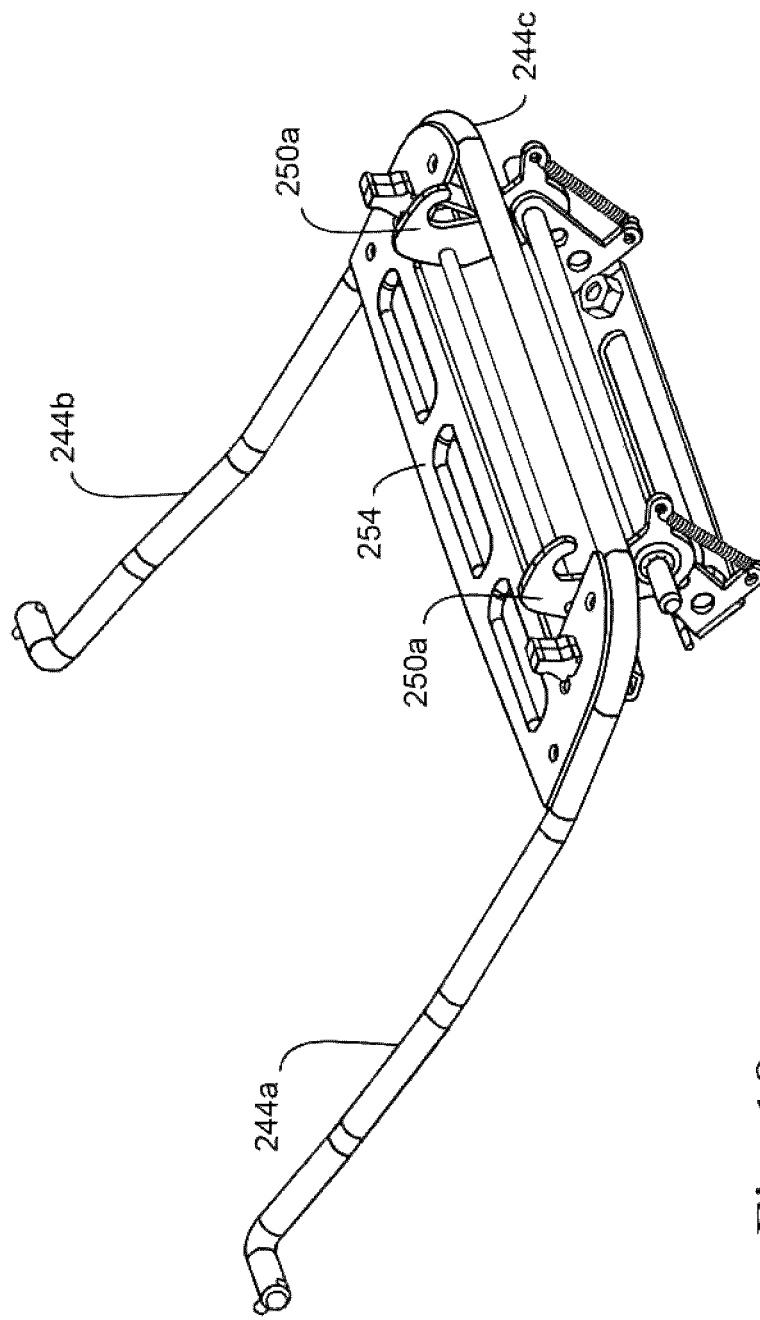
FIG. 18 is a top perspective view of the belt tensioning system as shown in FIG. 17, but depicted without the release mechanism.

As shown in FIGS. 14 and 15, each A-hook 250 may include an apex portion 250*a* that is configured to capture the transverse arm 244*c* (and retain the transverse arm 244*c* therein) when the tensioning arm 244 is disposed in the tension position and the A-hook 250 is disposed in the engaged position. Conversely, as shown in FIGS. 17 and 18, the transverse arm 244*c* is disengaged from the A-hook 250 when the A-hook 250 is disposed in the disengaged position. Further, the lap belt or lap/shoulder belt will apply a load to the capture mechanism, via the tensioning arm 244 when the tensioning arm 244 is disposed in the tension position (and the A-hook 250 is disposed in the engaged position). Therefore, when the tensioning arm 244 is disposed in the tension position and the capture mechanism is disposed in the engaged position, the transverse arm 244*c* will be captured within the apex portion 250*a* and the A-hook(s) 250 may be precluded from moving into the disengaged position, until at least the load on the capture mechanism has been removed or reduced (e.g. until the tensioning arm 244 is rotated into the unloaded position).

The release mechanism is configured to release the tensioning arm 244 from the capture mechanism. Further, since the load (applied to the capture mechanism via the vehicle belt when the tensioning arm 244 is disposed in the loaded position and the capture mechanism is disposed in the engaged position) is only removed from the capture mechanism when the tensioning arm 244 is rotated into the unloaded position, the release mechanism may be configured to release the tensioning arm 244 from the capture mechanism only after the tensioning arm 244 is disposed in the unloaded position.

Figure 11:
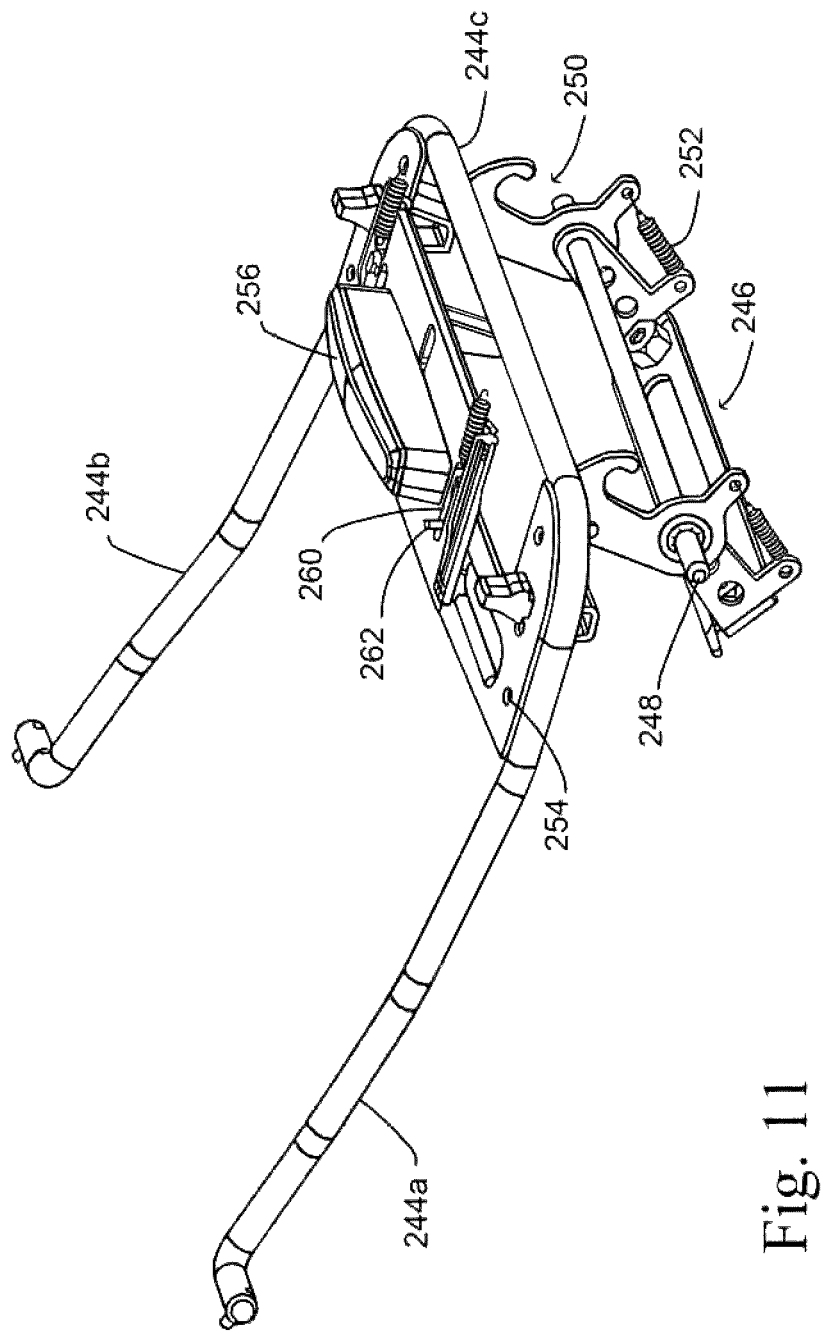
FIG. 11 is a top perspective view of the belt tensioning system as shown in FIG. 10, but with elements removed to be better show the capture mechanism and the release mechanism.
Figure 12:
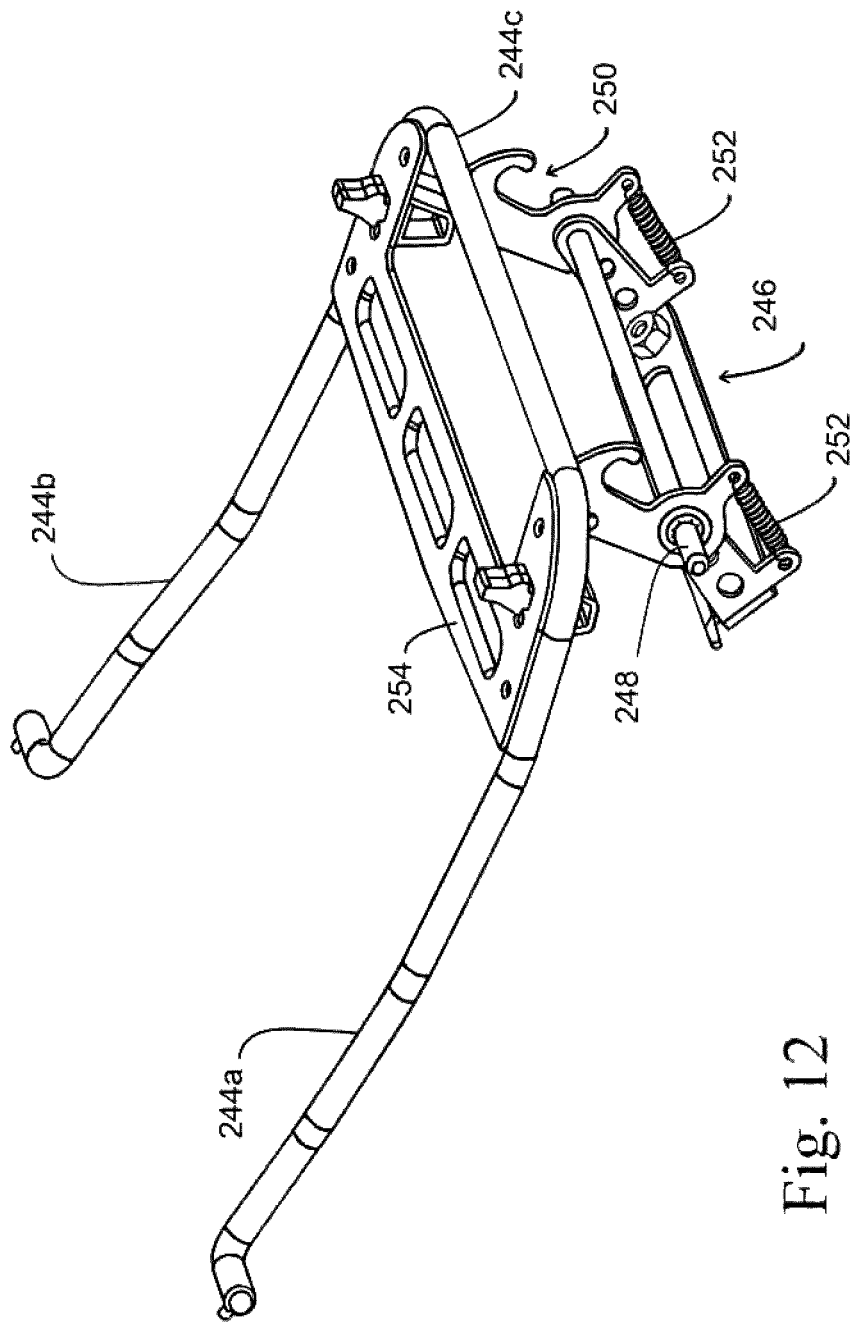
FIG. 12 is a top perspective view of the belt tensioning system as shown in FIG. 11, but depicted without the release mechanism.
Figure 13:
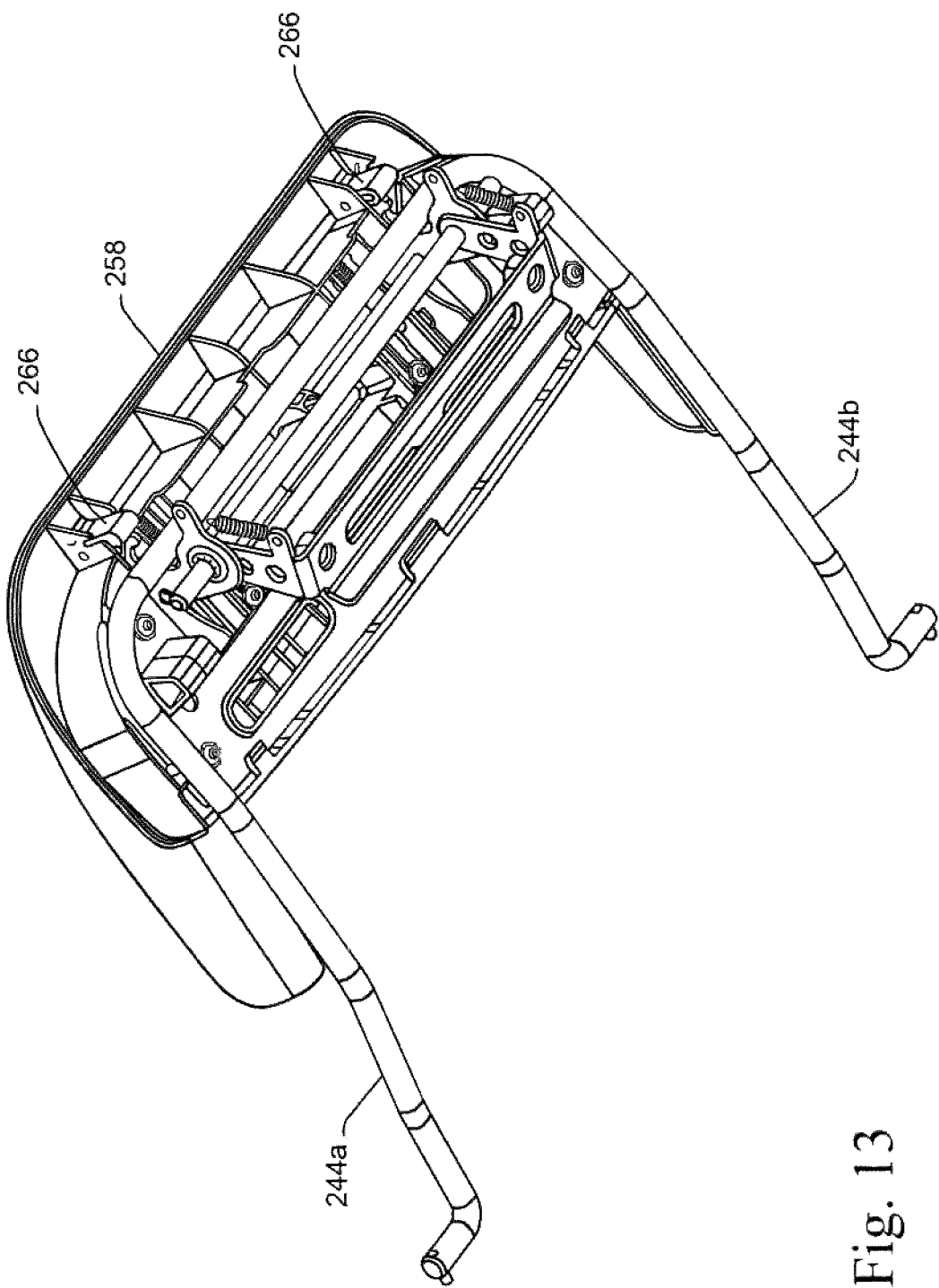
FIG. 13 is a bottom perspective view of the belt tensioning system, depicting the tensioning arm in the tension position, and depicting the release mechanism and the capture mechanism in an engaged position.

As shown in FIGS. 9-11, the release mechanism is provided on the tensioning arm 244, and includes a tray member 254, and a tension release lever 256, and may also include a cover member 258. The tray member 254 is secured to the side arms 244a, 244b, proximate the transverse arm 244c, and may support the tension release lever 256. The tray member 254 may include a pair of dowels 262 that extend from an upper surface of the tray member 254. The cover member 258 may be secured to the side arms 244a, 244b and the transverse arm 244c and cover the tray member 254 and the tension release lever 256.

The tension release lever 256 may include guide channels 260, disposed on opposite sides of the tension release lever 256. The guide channels 260 may retain a respective one of the dowels 262 therein, and thereby slidably couple the tension release lever 256 to the tray member 254.

As will be explained, the tension release lever 256 is slidably movable (relative to the tray member 254) between (i) a locked position in which the tension release lever 256 is disposed in proximity to the transverse arm 244c and (ii) an unlocked position in which the tension release lever 256 is disposed distally from the transverse arm 244c. The release mechanism may also include at least one return spring 264 that extends between the tension release lever 256 and the cover member 258, and urges the tension release lever 256 to slide into (return to) the locked position from the unlocked position.

The tray member 254 may also support at least one status indicator 266 (FIGS. 10, 13) that is visible through the apertures in the cover member 258 and configured to visually indicate whether the A-hook(s) 250 is/are disposed in the engaged position. The status indicator 266 may be rotatably coupled to the tray member 254, and each A-hook 250 may be configured to rotate a respective status indicator 266 from (i) an unlocked indicator position (see, e.g. FIG. 10), in which the A-hook 250 is disposed in the disengaged position and the apex portion 250a is displaced from the status indicator 266) into (ii) a locked indicator position (see, e.g. FIG. 13), in which the A-hook 250 is disposed in the engaged position and the apex portion 250a engages the status indicator 266).

As shown in FIG. 17, the capture mechanism may include a connecting rod 268 that extends between and interconnects the A-hooks 250 (where the capture mechanism includes more than one A-hook 250), and the tension release lever 256 may include a finger 270 that extends towards the capture mechanism. In this implementation, the finger 270 is be configured to engage the connecting rod 268 and urge the A-hooks 250 out of the engaged position (e.g. when the tensioning arm 244 is disposed in the unloaded position) into the disengaged position, as the tension release lever 256 is moved from the locked position into the unlocked position. Further, the finger 270 is displaced from the connecting rod 268 when the tension release lever 256 is disposed in the locked position. Therefore, the capture mechanism is normally urged into the engaged position (e.g. via the return spring(s) 264), and is held in the disengaged position only when the release mechanism is held in the unlocked position.

The foregoing configuration of the capture mechanism and the release mechanism is particularly advantageous since the capture mechanism may be rotated from the disengaged position into the engaged position (when the release mechanism is disposed in the locked position). As a result, the safety seat installer may secure the child safety seat 100 to the vehicle seat by extending a vehicle belt across the base portion 204, via the belt guides 238, and rotating the tensioning arm 244 into the tension position (and thereby capturing the vehicle belt between the tensioning arm 244 and the base portion and applying tension to the vehicle belt), all without manipulating the release mechanism (i.e. without having to move the tension release lever 256 into the locked position).

Figure 8:
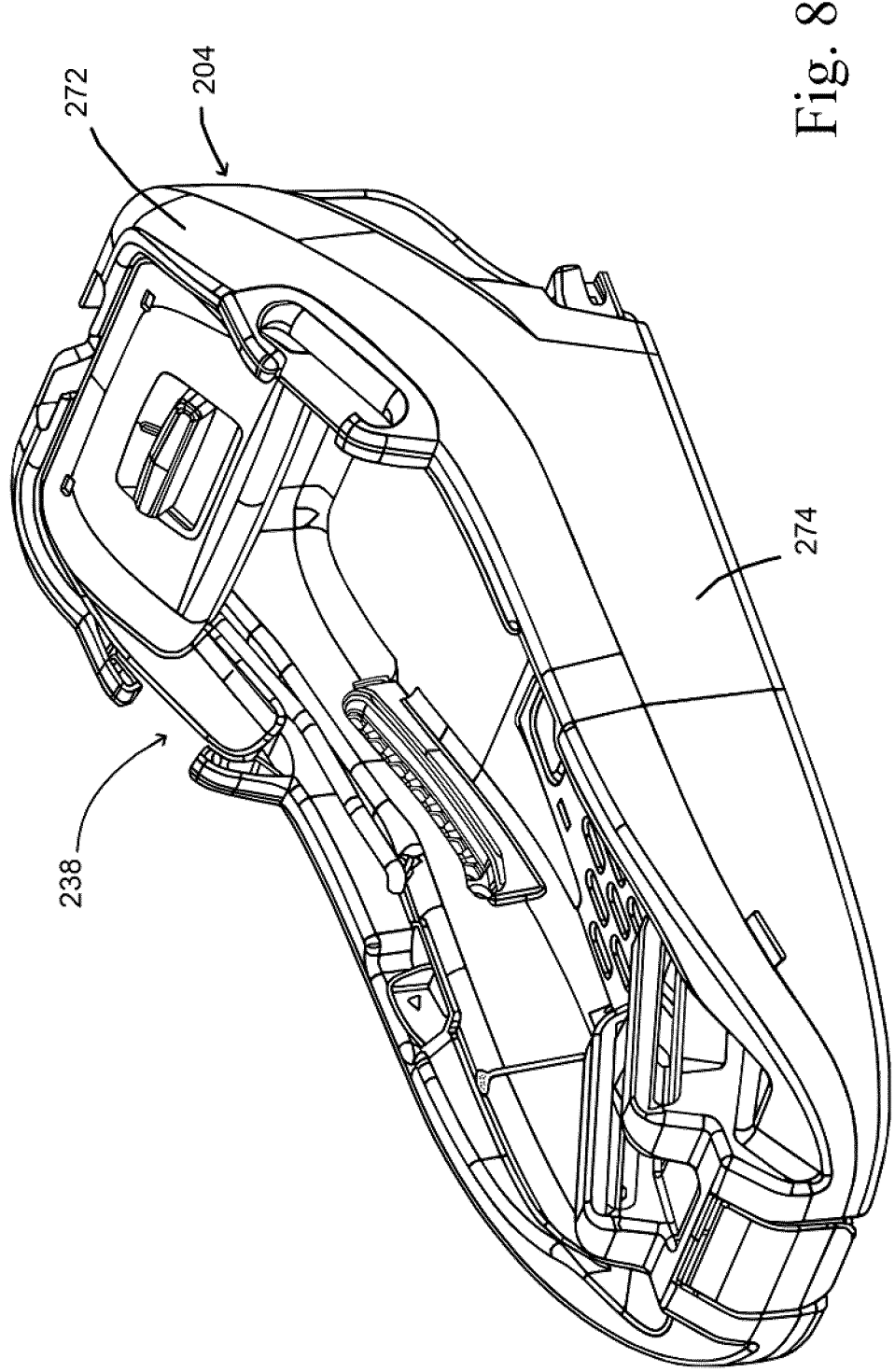
FIG. 8 is a front perspective view of the seat base, depicted without the sled assembly but with the belt tensioning system in a tension position.
Figure 21:
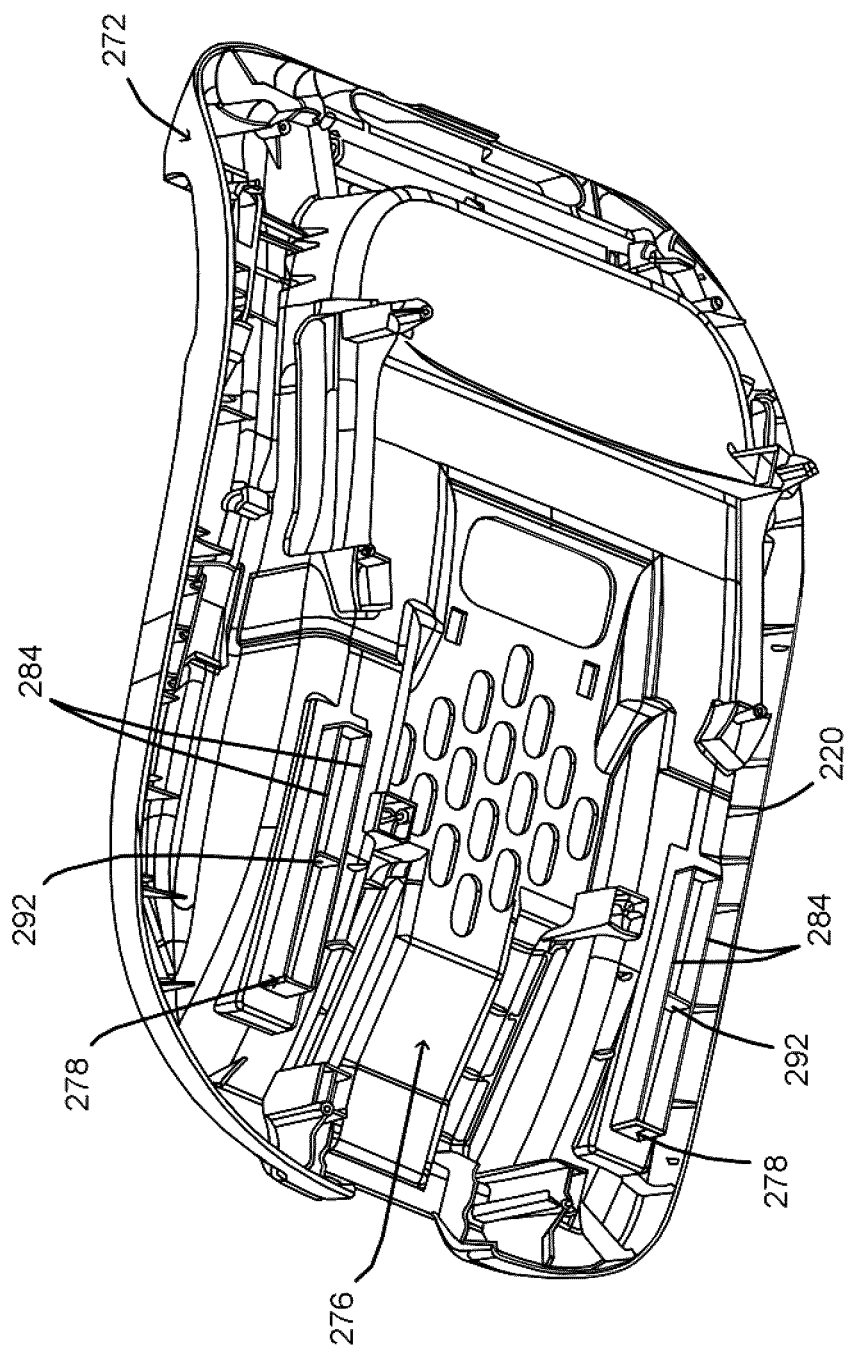
FIG. 21 is a bottom perspective view of the seat lid, depicting impactor pistons of the energy absorber.

As shown in FIG. 8, the base portion 204 includes a base lid 272 and a base pan 274 that is fastened to the base lid 272. The base lid 272 covers the base pan 274 and, together with the base pan 274, defines a base portion cavity 276 therebetween (see FIGS. 21, 22). Further, as will be apparent from the foregoing discussion, the base lid 272 supports the belt tensioning system and includes the front elongate slide channel 216 and the rear elongate slide channel 222. The base pan 274 supports the rigid latch mechanism and includes apertures (not shown) through which the latch members 234 and the jaws 242 extend.

The base portion 204 may also include an energy absorber that is disposed within the base portion cavity 276. As will be explained, the energy absorber is configured to dissipate impact forces that may be imposed on the seat base 200 during a deceleration of the seat base 200.

Figure 19:
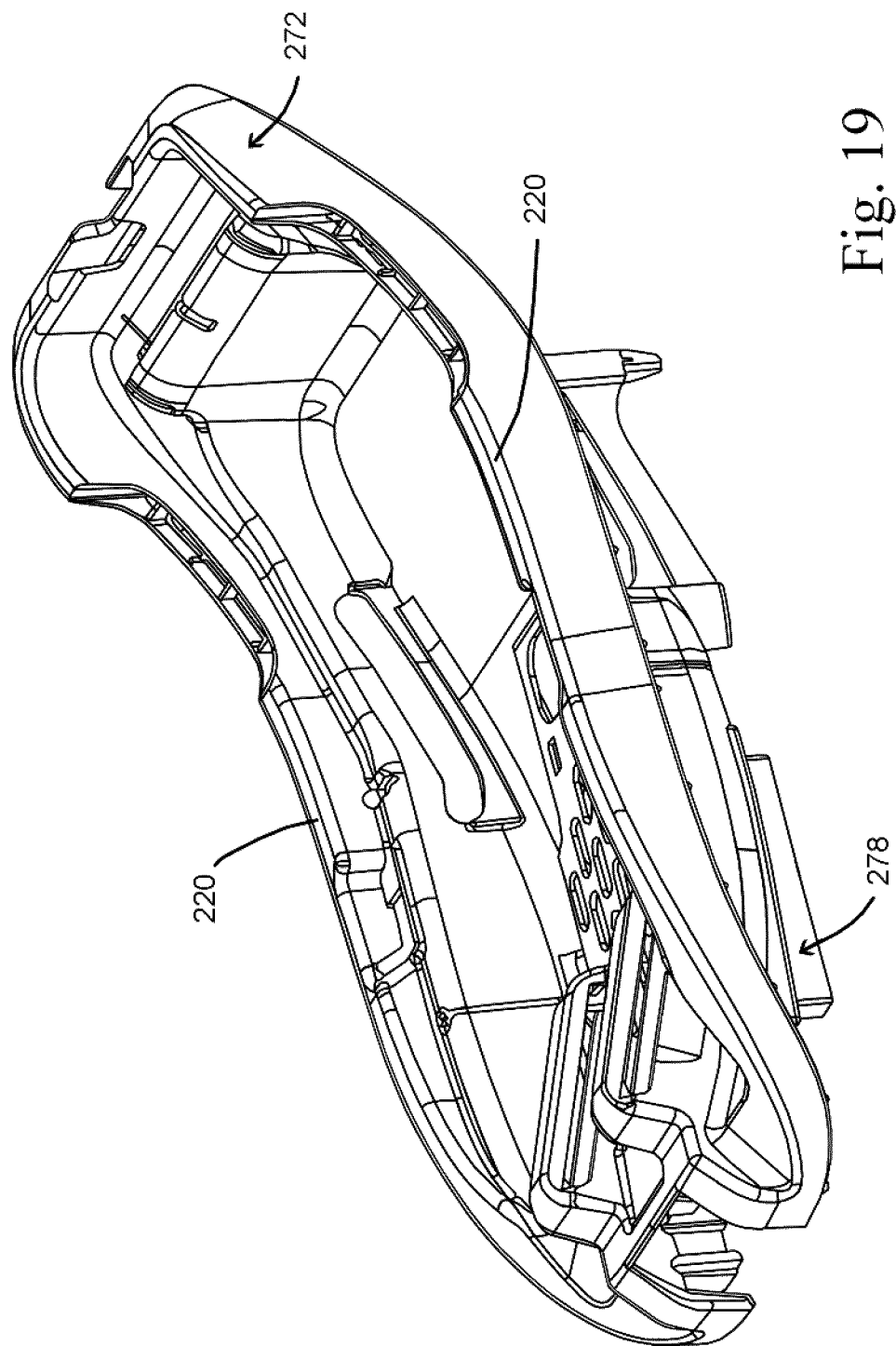
FIG. 19 is a top perspective view of the seat lid of the seat base.
Figure 20:
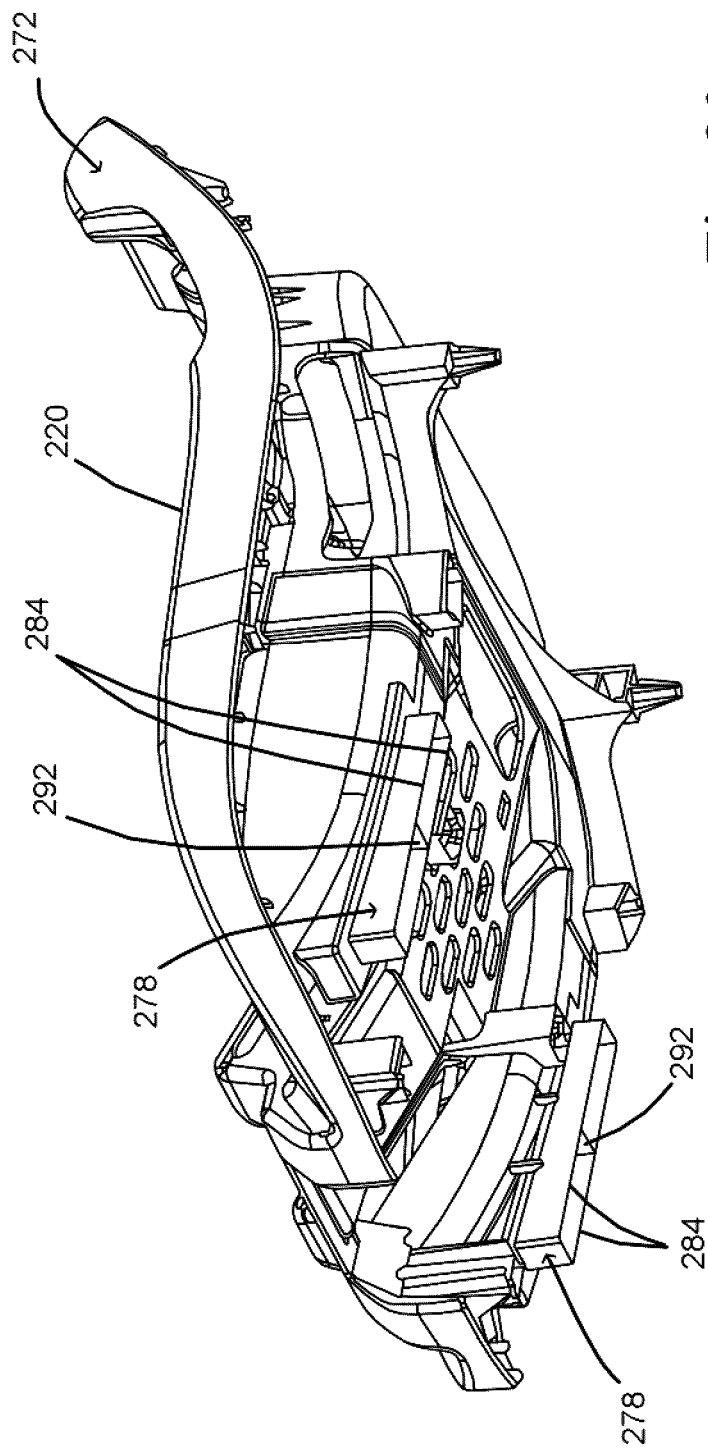
FIG. 20 is an elevation view of the seat lid.
Figure 22:
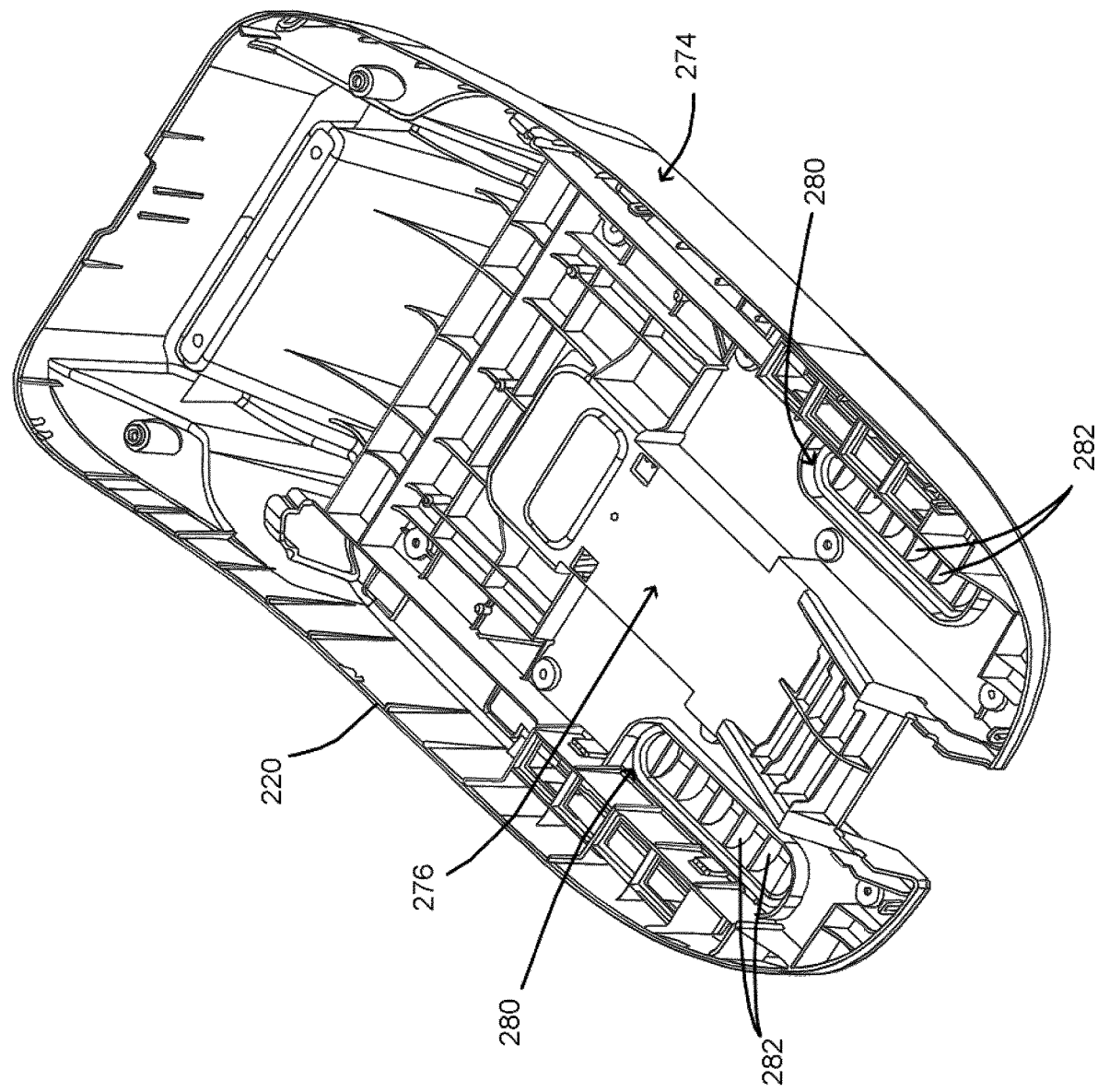
FIG. 22 is a top perspective view of the seat pan of the seat base.
Figure 23:
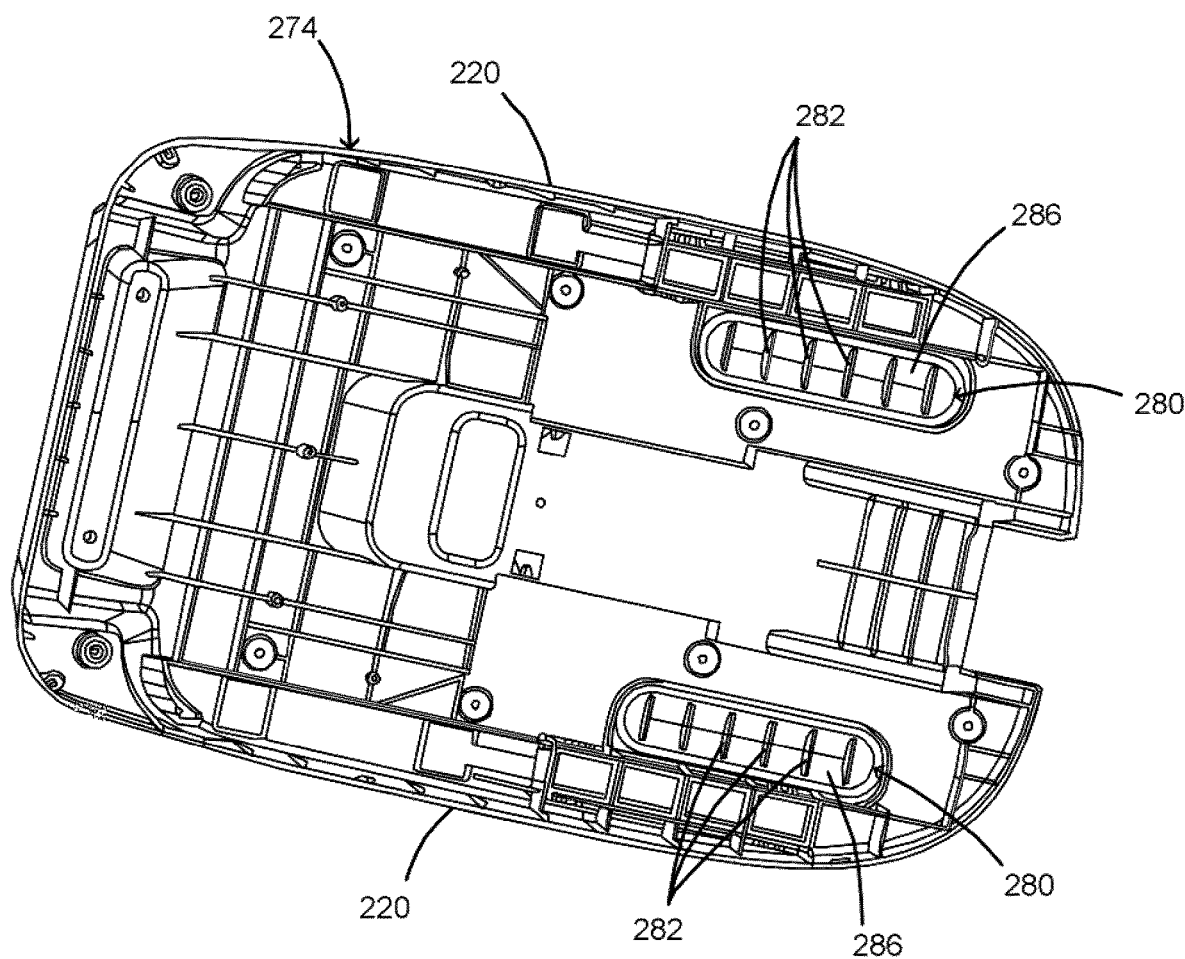
FIG. 23 is a top plan view of the seat pan, depicting energy absorbing members of the energy absorber.
Figure 24:
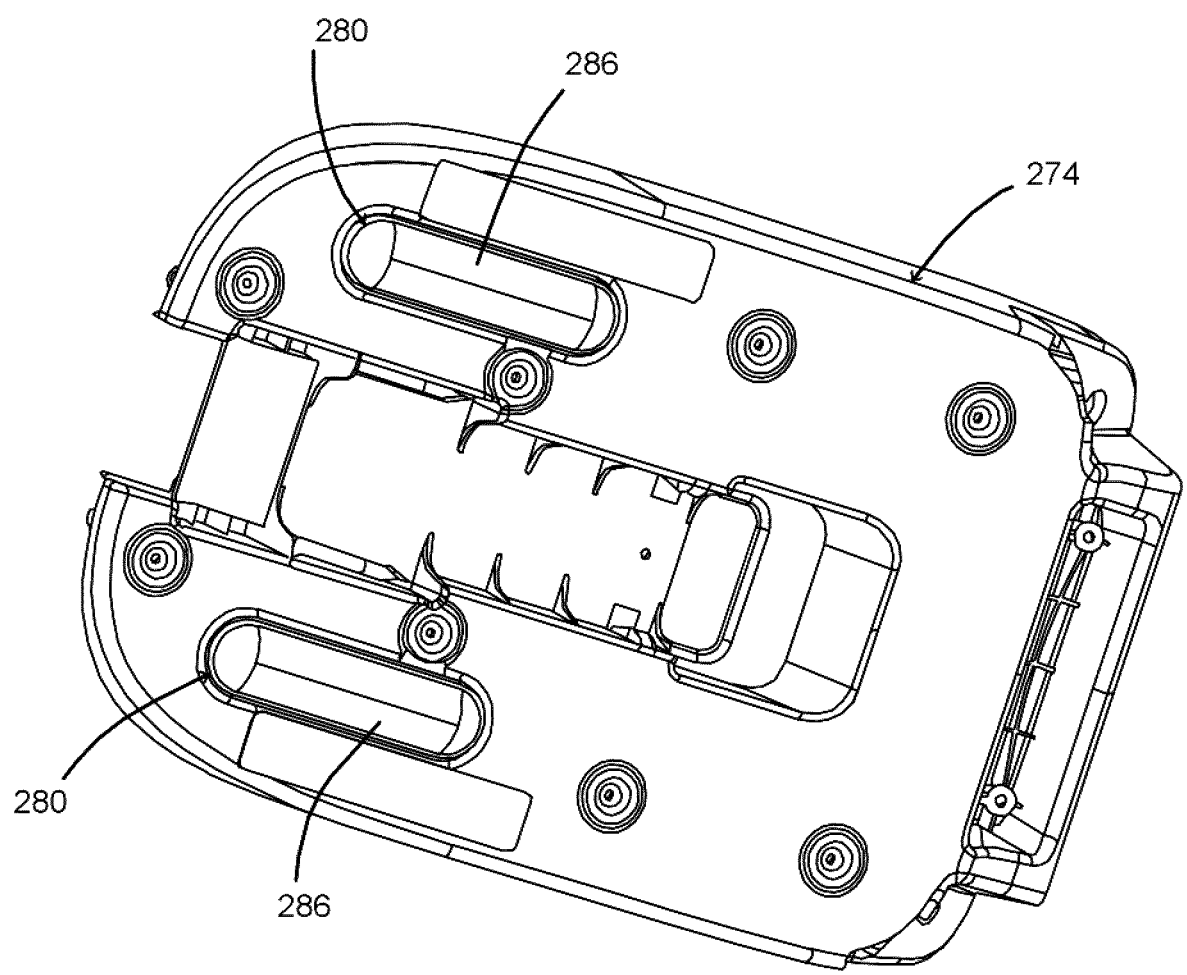
FIG. 24 is a bottom plan view of the seat pan.
Figure 26:
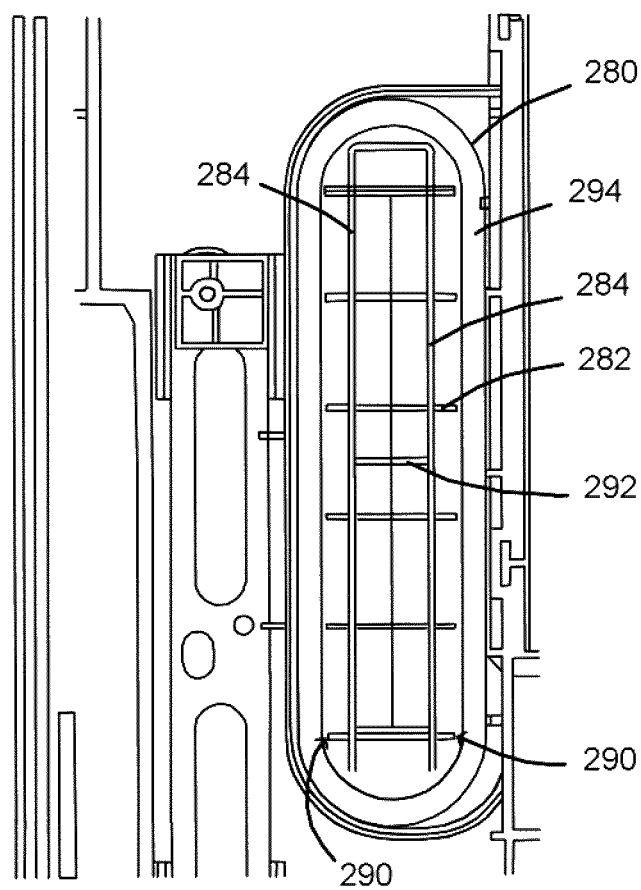
FIG. 26 is a schematic view depicting the vertical alignment of the impactor piston and the energy absorbing member of a piston/absorber pair.
Figure 27:
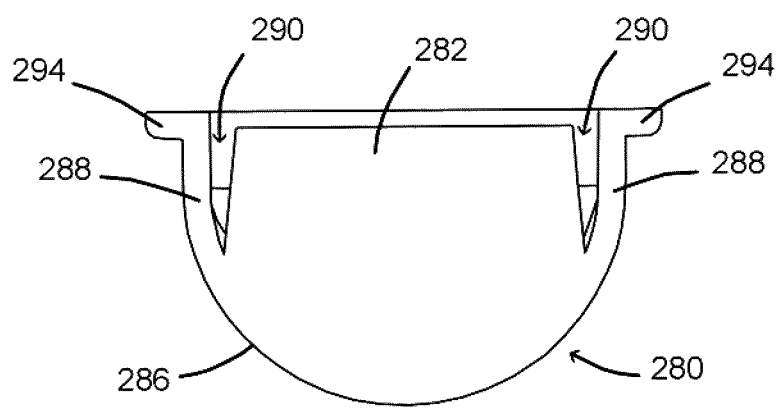
FIG. 27 is a transverse cross-sectional view of one of the energy absorbing members.

In the embodiment shown, the energy absorber includes a pair of impactor pistons 278 that are provided on the base lid 272 within the base portion cavity 276 (see FIGS. 19-21), and a corresponding pair of energy absorbing members 280 that are supported by the base pan 274 and disposed within the base portion cavity 276 (see FIGS. 22-23). As shown, the impactor pistons 278 are disposed at opposite sides of the base portion 204, each proximate a respective one of the base sides 220. Similarly, the energy absorbing members 280 are disposed at opposite sides of the base portion 204, each proximate a respective one of the base sides 220. Further, as shown in FIG. 26, each impactor piston 278 is vertically-aligned with a respective one of the energy absorbing members 280. Therefore, hereafter, each impactor piston 278 and associated energy absorbing member 280 will be referred to as a piston/absorber assembly.

As will be explained, the energy absorbing members 280 are configured to translate away from the base pan 274 and towards the base lid 272 during the deceleration of the seat base 200, and the impactor pistons 278 are configured to deform the respective energy absorbing members 280 and thereby dissipate impact forces that may be imposed on the seat base 200 during the deceleration of the seat base 200. Therefore, although the energy absorber is shown including two piston/absorber assemblies, with each piston/absorber assembly being disposed proximate a respective one of the base sides 220, the energy absorber may instead include a single piston/absorber assembly disposed, for example, centred in the base portion 204, proximate the front thereof, provided that the energy absorber is able to adequately dissipate the impact forces on the seat base 200.

Alternately, the energy absorber may include a greater number of piston/absorber assemblies, arranged around the base sides 200 and/or the front/rear of the base portion 204, as may be required to dissipate the impact forces on the seat base 200. Further, the piston/absorber assemblies may have different energy absorbing capabilities. Therefore, for example, the piston/absorber assemblies disposed proximate the front of the base portion 204 may be configured to absorb impact forces more readily than the piston/absorber assemblies disposed proximate the rear of the base portion 204.

In the implementation shown, each energy absorbing member 280 has an elongate axis, and at least one resilient rib 282 that extends transversely to the elongate axis (see FIGS. 22-25). As shown, each resilient rib 282 may be substantially planar and have a pair of opposite ends. Further, each impactor piston 278 includes at least one impactor rib 284 that extends substantially parallel to the elongate axis of the associated energy absorbing member 280 (see FIGS. 19-21). As shown, each impactor ribs 284 may be substantially planar, and configured to engage and deform the resilient ribs 282 of the associated energy absorbing member 280 as the energy absorbing member 280 translates towards the base lid 272.

However, the energy absorber is not limited to this particular configuration. Instead, the energy absorbing members 280 may be provided with resilient ribs 282 that have an orientation and/or shape/profile different from that depicted in the drawings. Therefore, the resilient ribs 282 of one or more of the energy absorbing members 280 may extend parallel to the elongate axis, as an example. Alternately, one or more of the energy absorbing members 280 may include resilient ribs 282 that extend transversely to the elongate axis, and additional resilient ribs 282 that extend parallel to the elongate axis. Further, one or more of the energy absorbing members 280 may lack an elongate axis and may, for example, have a substantially square profile.

Each impactor piston 278 of a piston/absorber assembly may include a pair of the impactor ribs 284 each disposed proximate (but laterally inwards from) a respective one of the ends of the resilient ribs 282 of the piston/absorber assembly (see FIGS. 19-21 and 26).

Each energy absorbing member 280 may include an absorber bottom 286, and the resilient ribs 282 may be secured to and extend from the absorber bottom 286. Each energy absorbing member 280 may also include an absorber side wall 288 that extends from the absorber bottom 286 and surrounds the resilient ribs 282. Each energy absorbing member 280 may also include a gap 290 disposed between the absorber sidewall 288 and the ends of the resilient ribs 282 (see FIGS. 22-27). This implementation has been determined to be advantageous since it facilitates bending movement of the resilient ribs 282 as the impactor piston 278 engages/deforms the resilient ribs 282.

In one exemplary implementation, each impactor piston 278 is fabricated from polypropylene, and is integrally molded with the base lid 272. The impactor ribs 284 have a substantially planar profile along the (lower) end that engages the resilient ribs 282. The impactor piston 278 may also include a cross-rib 292 that extends between, and is integrally-molded with, the impactor ribs 284, thereby increasing the rigidity of the impactor piston 278 (see FIGS. 21 and 26). Further, the impactor ribs 284 of each impactor piston 278 are 128 mm in length, and are separated from each other by a uniform gap of 14.8 mm.

In this same exemplary implementation, each energy absorbing member 280 is fabricated from polypropylene, and the resilient ribs 282 and the absorber side wall 288 are integrally-molded with the absorber bottom 286. The resilient ribs 282 have a substantially planar profile along the (upper) end that engages the impactor ribs 284, and the absorber bottom 286 has a substantially-arcuate lateral cross-sectional profile see FIGS. 25-27). Further, the resilient ribs 282 are each 24.7 mm wide at the upper end thereof, 1 mm thick at the upper end, and 20.5 mm in height (measured from the upper end thereof to the lower surface of the absorber bottom 286). The absorber side wall 288 has uniform thickness of 2 mm.

The base pan 274 may be provided with an aperture (not shown) that has a shape closely corresponding to that of the outer surface of the absorber side wall 288, but dimensioned to slidably receive the energy absorbing member 280 therein. Further, the absorber side wall 288 of each energy absorbing member 280 may include an outwards-extending lip 294 that is disposed at the upper end of the absorber side wall 288, distal to the absorber bottom 286, and engages the base pan 274. This configuration allows the energy absorbing member 280 to translate away from the base pan 274 and towards the base lid 272 during the deceleration of the seat base 200, while also preventing the energy absorbing member 280 from moving downwards through the base pan aperture and out of the base portion 204.

The outwards-extending lip 294 of each energy absorbing member 280 may include an outwards-extending channel that engages the base pan 274, along the base pan aperture, and is configured to maintain the energy absorbing member 280 in a pre-impact position in which the outwards-extending lip 294 is secured to the base pan 274. The resilient ribs 282, however, are recessed below the outwards-extending lip 294. Therefore, the energy absorbing member 280 of each piston/absorber assembly is in proximity to, but does not engage the associated impactor piston 278, when the energy absorbing member 280 is in the pre-impact position. Further, in the pre-impact position, the absorber bottom 286 and a substantial portion of the absorber side wall 288 of each energy absorbing member 280 extend downwards from the base pan 274 and outwards from the base portion 204 (see FIG. 24).

Preferably, the outwards-extending channel is also configured to release the energy absorbing member 280 from the pre-impact position and to allow the energy absorbing member 280 to translate from the base pan 274 towards the impactor piston 278 when the impact forces exceed a predetermined maximum limit.

Having described the child safety seat 100, the belt tensioning system and the energy absorber, the operation of the child safety seat 100 will now be described.

As discussed, the child safety seat 100 may be installed in a motor vehicle by placing the seat base 200 on a vehicle seat, and securing the seat base 200 to the motor vehicle by, for example, extending the latch members 234 rearwardly from the seat base 200, securing the latch members 234 to the LATCH system vehicle anchors via the jaws 242, and sliding the seat base 200 on the vehicle seat cushion, rearwards towards the vehicle seat back, while actuating the latch release lever 236.

The safety seat installer may then use the belt tensioning system to firmly secure the seat base 200 to the vehicle seat. If the tensioning arm 244 is disposed in the tension position, the safety seat installer may release the tensioning arm 244 from the capture mechanism by rotating the tensioning arm 244 into the unloaded position (e.g. by pressing downwards on the cover member 258), moving the tension release lever 256 into the unlocked position from the locked position (and thereby releasing the tensioning arm 244 from the capture mechanism). The safety seat installer may then rotate the tensioning arm 244 away from the unloaded position into the release position, and release the tension release lever 256 (thereby allowing the tension release lever 256 to return to the locked position).

After the tensioning arm 244 has been rotated into the release position, the safety seat installer may connect a vehicle belt to the seat base 200 by drawing the vehicle belt across the base portion 204 and through the belt guides 238, and rotating the tensioning arm 244 into the tension position.

As the tensioning arm 244 rotates into the tension position, the transverse arm 244c travels downwards along the apex portion 250a of the A-hook(s) 250, causing the A-hook(s) 250 to rotate away from the engaged position, towards the disengaged position. After the transverse arm 244c travels past the apex portion 250a, the return springs 252 cause the A-hook(s) 250 to return to the engaged position, thereby causing the apex portion(s) 250a to retain the transverse arm 244c in the A-hook(s) 250 and the A-hook(s) 250 to rotate the status indicator(s) 266 into the locked indicator position.

While the tensioning arm 244 is disposed in the tension position, the tensioning arm 244 applies tension to the vehicle belt, thereby firmly securing the seat base 200 to the vehicle seat. The tensioning arm 244 is locked in the tension position by the apex portion(s) 250a, and the A-hook(s) 250 are precluded from rotating into the disengaged position by the shape of the apex portion(s) 250a and the load that is applied to the tensioning arm 244 and the A-hook(s) 250 by the vehicle belt.

After the tensioning arm 244 has been locked in the tension position, and the seat base 200 has been secured to the vehicle seat via the tension in the vehicle belt, the safety seat installer may subsequently disengage the seat base 200 from the vehicle seat rotating the tensioning arm 244 into the unloaded position (e.g. by pressing downwards on the cover member 258). When the tensioning arm 244 is in the unloaded position, the tensioning arm 244 still applies tension to the vehicle belt. However, when the tensioning arm 244 is in the unloaded position, the transverse arm 244c is displaced from the apex portion(s) 250a and, therefore, the load on the A-hook(s) 250 is reduced in comparison to that when the tensioning arm 244 is in the tension position. The safety seat installer may then release the tensioning arm 244 from the capture mechanism by moving the tension release lever 256 into the unlocked position from the locked position, thereby causing the finger 270 to engage the connecting rod 268 and urge the A-hooks 250 out of the engaged position into the disengaged position.

After the A-hooks 250 are disposed in the disengaged position, the safety seat installer may then rotate the tensioning arm 244 away from the unloaded position into the release position, and release the vehicle belt from the belt guides 238.

However, while the seat base 200 is still secured to the vehicle seat (whether via the LATCH system and/or the belt tensioning system), the absorber bottom 286 of the energy absorbing members 280 extend downwards from the base pan 274 and press firmly against the seat cushion of the vehicle seat. If the vehicle subsequently decelerates rapidly, the seat base 200 will be exposed to impact forces due to the momentum of the child and the safety seat 100.

As a vector, the impact forces on the seat base can be considered to have both a horizontally-oriented component and a vertically-oriented component. However, typically the impact forces dynamically change in both direction and magnitude throughout the duration of the impact. Therefore, the magnitude of both the horizontally-oriented component and the vertically-oriented component of the impact forces will likewise dynamically change throughout the duration of the impact. The horizontally-oriented component of the impact forces will urge the safety seat 100 in a horizontal direction away from the vehicle seat back. However, since the base portion 204 is secured to the vehicle seat, the safety seat 100 is prevented from travelling a significant distance horizontally relative to the vehicle seat back. If the magnitude of the vertically-oriented component of the impact forces on the base portion 204 is not significant (e.g. the vehicle has not been involved in a collision), the radially outwards-extending channel of each outwards-extending lip 294 of each energy absorbing member 280 will remain in engagement with the base pan 274 and, therefore, each energy absorbing members 280 will remain in the pre-impact position in which the energy absorbing member 280 of each piston/absorber assembly does not engage the associated impactor piston 278.

However, if the magnitude of the vertically-oriented component of the impact forces on the base portion 204 exceeds the predetermined maximum limit that can be sustained by the radially outwards-extending channel of the energy absorbing members 280 (e.g. the vehicle has been involved in a collision), the radially outwards-extending channel of one or more of the outwards-extending lips 294 will become disengaged from the base pan 274 thereby allowing the energy absorbing member 280 of a piston/absorber pair to move upwards within the base portion cavity 276 towards the associated impactor piston 278. As a result, the base portion 204 will move downwards, towards the seat cushion of the vehicle seat.

As the energy absorbing member 280 of a piston/absorber pair moves upwards within the base portion cavity 276, the energy absorbing member 280 of the piston/absorber pair engages the associated impactor piston 278, and the impactor ribs 284 of the impactor piston 278 engage and deform/bend the resilient ribs 282 of the associated energy absorbing member 280, thereby causing some of the kinetic energy of the child and the safety seat 100 to be transferred through the impactor pistons 278 to the energy absorbing members 280. As a result, a portion of the vertical impact forces on the child and the safety seat 100 will be dissipated/transferred through the energy absorbing members 280.

The invention claimed is:

1. A seat base comprising:
   a base pan;
   a base lid secured to the base pan, the base lid and the base plan together defining a cavity therebetween; and
   an energy absorber disposed within the cavity and comprising an impactor piston provided on the base lid and an energy absorbing member supported by the base pan,
   wherein the energy absorbing member is configured to translate away from the base pan and towards the base lid during a deceleration of the seat base, and the impactor piston is configured to deform the energy absorbing member and to dissipate impact forces imposed on the seat base during the deceleration of the seat base.

2. The seat base according to claim 1, wherein:
   the energy absorbing member includes an elongate axis and a plurality of resilient ribs extending transverse to the elongate axis; and
   the impactor piston includes at least one impactor rib extending substantially parallel to the elongate axis and configured to deform the resilient ribs as the resilient ribs translate towards the base lid.

3. The seat base according to claim 2, wherein the resilient ribs each include a pair of opposite rib ends, and the energy absorbing member includes:
   an absorber bottom, the resilient ribs secured to and extending from the absorber bottom;
   an absorber side wall extending from the absorber bottom and surrounding the resilient ribs; and
   a gap provided between the absorber sidewall and the rib ends, wherein the gap facilitates bending movement of the resilient ribs as the impactor piston deforms the resilient ribs.

4. The seat base according to claim 3, wherein the base pan is configured to engage the absorber side wall and maintain the energy absorbing member in a pre-impact position, and to release the energy absorbing member from the pre-impact position when the impact forces exceed a predetermined maximum limit.

5. The seat base according to claim 3, wherein the impactor piston includes a pair of the impactor ribs each disposed proximate a respective one of the rib ends.

6. A child safety seat comprising:
    a seat base including a base pan and a base lid secured to the base pan, the base lid and the base plan together defining a cavity therebetween;
    a seat body detachably coupled to the seat base; and
    an energy absorber disposed within the cavity and comprising an impactor piston provided on the base lid and an energy absorbing member supported by the base pan,
    wherein the energy absorbing member is configured to translate away from the base pan and towards the base lid during a deceleration of the child safety seat, and the impactor piston is configured to deform the energy absorbing member and to dissipate impact forces imposed on the seat body during the deceleration of the child safety seat.

7. The child safety seat according to claim 6, wherein:
    the energy absorbing member includes an elongate axis and a plurality of resilient ribs extending transverse to the elongate axis; and
    the impactor piston includes at least one impactor rib extending substantially parallel to the elongate axis and configured to deform the resilient ribs as the resilient ribs translate towards the base lid.

8. The child safety seat according to claim 7, wherein the resilient ribs each include a pair of opposite rib ends, and the energy absorbing member includes:
    an absorber bottom, the resilient ribs secured to and extending from the absorber bottom;
    an absorber side wall extending from the absorber bottom and surrounding the resilient ribs; and
    a gap provided between the absorber sidewall and the rib ends,
    wherein the gap facilitates bending movement of the resilient ribs as the impactor piston deforms the resilient ribs.

9. The child safety seat according to claim 8, wherein the base pan is configured to engage the absorber side wall and maintain the energy absorbing member in a pre-impact position, and to release the energy absorbing member from the pre-impact position when the impact forces exceed a predetermined maximum limit.

10. The child safety seat according to claim 8, wherein the impactor piston includes a pair of the impactor ribs each disposed proximate a respective one of the rib ends.

* * * * *